United States Patent [19]

Hongo

[11] Patent Number: 5,734,878
[45] Date of Patent: Mar. 31, 1998

[54] MICROCOMPUTER IN WHICH A CPU IS OPERATED ON THE BASIS OF A CLOCK SIGNAL INPUT INTO ONE OF TWO CLOCK TERMINALS

[75] Inventor: Katsunobu Hongo, Itami, Japan

[73] Assignee: Mitsubishi Denki Kabushiki Kaisha, Tokyo, Japan

[21] Appl. No.: 546,126

[22] Filed: Oct. 20, 1995

[30] Foreign Application Priority Data

Jun. 28, 1995 [JP] Japan ................... 7-162569

[51] Int. Cl.⁶ ............................................. G06F 1/04
[52] U.S. Cl. ............................... 395/559; 395/560
[58] Field of Search ............................ 395/559, 560, 395/750

[56] References Cited

U.S. PATENT DOCUMENTS 4,780,843  10/1988  Tietjen ................... 364/900
5,388,265  2/1995   Volk ..................... 395/750
5,628,020  5/1997   O'Brien ................. 395/750

FOREIGN PATENT DOCUMENTS 62-111503  5/1987   Japan .
5-53402    8/1993   Japan .
6-91423    11/1994  Japan .

Primary Examiner—Dennis M. Butler
Attorney, Agent, or Firm—Burns, Doane, Swecker & Mathis, LLP

[57] ABSTRACT

A microcomputer constituted so that an oscillation state selection signal indicative of whether a clock inputted to a first clock terminal is a clock generated at a clock generating circuit is given to a first gate circuit interposed between a first clock terminal and a second clock terminal, and a first gate circuit is placed in the transmissible state when an oscillation state selection signal is on a first state while a first gate circuit is placed in a state not to be able to transmit a signal when the oscillation state selection signal is on a second state.

24 Claims, 20 Drawing Sheets

INTERRUPT REQUIREMENT STOP INSTRUCTION

MICROCOMPUTER IN WHICH A CPU IS OPERATED ON THE BASIS OF A CLOCK SIGNAL INPUT INTO ONE OF TWO CLOCK TERMINALS

BACKGROUND OF THE INVENTION

1. Field of the Invention

The present invention relates to a microcomputer provided with a CPU operated in synchronization with a clock.

2. Description of Related Art

A microcomputer incorporates a clock supply circuit for operating in synchronization with a clock a CPU and peripheral circuits such as a timer, a serial input/output interface or the like. The clock supply circuit in the microcomputer functions to suspend the supply of the clock, when the CPU and the peripheral circuits are not required to operate, with the effect that the power consumption is suppressed as much as possible. The function of suspending the supply of the clock can be a stop function to suspend the oscillation of the clock, or a wait function to suspend the supply of the clock to the CPU and peripheral circuits without stopping the oscillation of the clock.

FIG. 1 is a block diagram showing a structure of a conventional microcomputer. A microcomputer MC has a clock input terminal 10 and a clock output terminal 11. The clock input terminal 10 and the clock output terminal 11 are external terminals for connecting an external oscillation circuit which will be described later. Between the clock input terminal 10 and the clock output terminal 11, a parallel circuit of a feedback resistance 82 and an oscillation element 81 made of a ceramic or a quartz oscillator is interposed. The clock input terminal 10 is grounded via a capacitor 84, while the clock output terminal 11 is grounded via a capacitor 83. The feedback resistance 82, the oscillation element 81 and capacitors 83 and 84 constitute an external oscillation circuit 88. Further, the clock input terminal 10 is connected to one input terminal of a NAND circuit 12 for oscillation. An inversion stop signal #STP which is an inversion signal of a stop signal STP suspending the oscillation of the clock is input to the other input terminal of the NAND circuit 12.

An output terminal of the NAND circuit 12 is connected to the clock output terminal 11 and an input terminal of a Schmidt trigger circuit 14. An output terminal of the Schmidt trigger circuit 14 is connected to an input terminal of a noise canceler 15, while an output terminal of the noise canceler 15 is connected to one input terminal of an AND circuit 16. The other input terminal of the AND circuit 16 is connected to an output terminal of a NAND circuit 20. A wait state selection signal $S_W$ is inputted to one input terminal of the NAND circuit 20, which serves to select a state whereby the supply of the clock to peripheral circuits is suspended in a wait state of the microcomputer. A wait signal WIT is input to the other input terminal of the NAND circuit 20, which serves to suspend the clock supply to the CPU and the peripheral circuits. An output terminal of the AND circuit 16 is connected to an input terminal of a ½ frequency demultiplier 17. An output terminal of the ½ frequency demultiplier 17 is connected to one input terminal of an AND circuit 18 and an input terminal of a frequency demultiplying circuit 30. The other input terminal of the AND circuit 18 is connected to an output terminal of a NOR circuit 22. The wait signal WIT is input to one input terminal of the NOR circuit 22, while a stop signal $STP_1$ is input to the other input terminal of the NOR circuit 22. An output terminal of the AND circuit 18 is connected to a CPU 1.

The frequency demultiplying circuit 30 outputs clocks $f_i$ . . . $f_k$ divided in frequency so as to conform to the peripheral circuits 2 . . . 2 respectively. Moreover, a clock $f_{WDT}$ of a specific frequency is outputted from the circuit 30 to a counting means 31 to be counted thereat. An overflow signal OF outputted from the counting means 31 is input to a reset terminal R of an RS flip-flop 33. An output terminal Q of the RS flip-flop 33 is connected to one switching terminal of a switching means 32. The stop signal STP is given to a control terminal of the counting means 31, a set terminal S of the RS flip-flop 33 and the other switching terminal of the switching means 32. The RS flip-flop 33 is set by the stop signal STP and is reset by the overflow signal OF from the counting means 31. The switching means 32 is controlled and switched by a stop return selection signal $S_S$ which selects either suspending the oscillation of the clock or resuming of the oscillation. When the stop return selection signal $S_S$ is on the L-level, the switching means 32 selects one switching terminal. On the other hand, if the stop return selection signal $S_S$ is on the H-level, the switching means 32 selects the other switching terminal.

FIGS. 2A and 2B are block diagrams showing a structure of the Schmidt trigger circuit 14. In the Schmidt trigger circuit 14 shown in FIG. 2A, an input terminal $IN_{14}$ is connected to an input terminal of an inverter 50 and an output terminal of an inverter 51. An output terminal of the inverter 50 and an input terminal of the inverter 51 are connected to an output terminal $OUT_{14}$ of the Schmidt trigger circuit 14. In the Schmidt trigger circuit 14 shown in FIG. 2B, the input terminal $IN_{14}$ is connected to input terminals of an inverter 52 and an inverter 53. An output terminal of the inverter 52 is connected to one input terminal of an AND circuit 54 and one input terminal of an AND circuit 55. An output terminal of the inverter 53 is connected to the other input terminal of each of the AND circuits 54 and 55. An output terminal of the AND circuit 54 is connected to one input terminal of a NOR circuit 56. An output terminal of the AND circuit 55 is connected to one input terminal of a NOR circuit 57. An output terminal of the NOR circuit 58 is connected to the other input terminal of the NOR circuit 57. An output terminal of the NOR circuit 57 is connected to the other input terminal of the NOR circuit 56 and the output terminal $OUT_{14}$ of the Schmidt trigger circuit 14.

FIGS. 3A and 3B are block diagrams showing a structure of the noise canceler 15. In the noise canceler 15 shown in FIG. 3A, an input terminal $IN_{15}$ of the canceler is connected to one input terminal of a NAND circuit 64 via a series circuit of inverters 60, 61, 62 and 63. The input terminal $IN_{15}$ is also directly connected to the other input terminal of the NAND circuit 64. An output terminal of the AND circuit 64 is connected to an input terminal of an inverter 65 which has an output terminal connected to an output terminal $OUT_{15}$ of the noise canceler 15. In the noise canceler shown in FIG. 3B, the input terminal $IN_{15}$ is connected to an input terminal of an inverter 67 via a series circuit of an inverter 66 and a resistance 68. A connecting part between the resistance 68 and the input terminal of the inverter 67 is grounded via a capacitor 69. An output terminal of the inverter 67 is connected to the output terminal $OUT_{15}$ of the noise canceler 15.

Next, an operation of the microcomputer shown in FIG. 1 will be explained. As shown in FIG. 1, when the external oscillation circuit 88 for self-excited oscillation connected to the clock input terminal 10 and the clock output terminal 11 is oscillated, if a stop command for suspending the oscillation operation is not executed, that is, if the stop signal STP is on the L-level (the inversion stop signal #STP is on the H-level), the NAND circuit 12 is turned to be able to transmit a signal. Consequently, the external oscillation circuit 88 is oscillated and driven, thereby generating a sine wave clock. Then, the sine wave clock given to the clock output terminal 11 through the NAND circuit 12 is input to the Schmidt trigger circuit 14, where the clock is shaped into a clock of a rectangular waveform. Thereafter, noise components are removed at the noise canceler 15. A clock $\phi_x$ is eventually given to the AND circuit 16.

In a state where a wait command which suspends the supply of a clock $\phi$ to the CPU 1 while oscillating the circuit 88 is not executed, namely, in a state where the wait signal WIT is on the L-level, an output #WIT$_1$ of the AND circuit 20 becomes H-level, so that the AND circuit 16 allows the clock $\phi_x$ outputted from the noise canceler 15 to pass therethrough to be inputted to the ½ frequency demultiplier 17. Consequently, the ½ frequency demultiplier 17 divides half the clock $\phi_x$ in frequency. The divided clock $f_2$ is inputted to the frequency demultiplying circuit 30 and divided and supplied to the peripheral circuits 2 . . . 2. Since the wait signal WIT and the stop signal STP$_1$ are both on the L-level, an output of the NOR circuit 22 is on the H-level. The clock $f_2$ inputted to the AND circuit 18 is accordingly passed through the circuit 18 as it is, so that the clock $\phi$ is supplied to the CPU 1.

Next, an explanation will be given to a case in which a clock of a rectangular wave having a stable frequency is inputted to the clock input terminal 10 from outside of the microcomputer MC without the external oscillation circuit 88 connected to the clock input terminal 10 and the clock output terminal 11. In this case, similar to the case in which the sine wave clock is inputted to the clock input terminal 10, the clock inputted to the clock input terminal 10 is inputted to the Schmidt trigger circuit 14 via the NAND circuit 12. Subsequently, like the clock in the self-excited oscillation, the clock is given to the AND circuit 16 via the noise canceler 15.

Next, an explanation will be given to an operation in a case where the stop command is executed to consume the least amount of power as possible by suspending the whole operation of the microcomputer, together with a timing chart of signals in each part shown in FIG. 4. In a case where the stop return selection signal $S_S$ is on the L-level, the stop signal STP is turned to the H-level immediately after the CPU executes the stop command. Then, the stop signal STP becomes L-level immediately after an interruption demand INT is generated. Until the stop signal STP is set to the H-level, or until the inversion stop signal #STP is set to the L-level, a clock $X_{OUT}$ of a sine wave which is an inversion of a sine wave clock $X_{IN}$ inputted to the clock input terminal 10 is obtained at the clock output terminal 11. Then, the clock $\phi_x$ is outputted from the noise canceler 15, so that a normal operation is performed, that is, the clock $f_2$ divided half in frequency is outputted from the ½ frequency demultiplier 17. Further, when the stop signal STP is changed to the H-level, the inversion stop signal #STP inputted to the other input terminal of the NAND circuit 12 is set to the L-level, whereby the output of the NAND circuit 12 is fixed at the H-level. Therefore, when the external oscillation circuit 88 is self-excited and oscillated, the self-excited oscillation is stopped at a time point when the stop signal STP is inverted to the H-level, and the clocks $X_{IN}$ and $X_{OUT}$ disappear. Further, even when the clock is inputted from outside, the clock $X_{IN}$ inputted to the clock input terminal 10 is shut, so that the clock $f_2$ to be supplied to the CPU 1 and the peripheral circuits 2 . . . 2 disappears.

Next, when the stop signal STP is inverted from the H-level to the L-level, in the case of the self-excited oscillation, the NAND circuit 12 is turned to a transmissible state to transmit a signal and the self-excited oscillation is resumed. However, it takes time before the oscillation operation is stabilized. In consequence, when the counting means 31 shown in FIG. 1 counts a predetermined time and outputs the overflow signal OF, generally, the stop signal STP$_1$ is inverted from the H-level to the L-level, so that the supply of the clock $\phi$ to the CPU 1 is resumed. To perform the above operation, the stop return selection signal $S_S$ is set to the L-level so that the switching means 32 in FIG. 1 selects the output of the RS flip-flop 33 which is reset by the overflow signal OF.

In a case where a clock is inputted to the clock input terminal 10 from the outside, the clock is outputted from the NAND circuit 12. In this operation, since the stop signal STP is inverted from the H-level to the L-level and it is not necessary to wait for the stabilization of the oscillation at the time of the return after the stop command, the stop return selection signal $S_S$ is set to the H-level, so that the stop signal STP is made the same as the stop signal STP$_1$. Accordingly, after the stop signal STP is inverted from the H-level to the L-level, the clock $\phi$ is immediately supplied to the CPU 1. In a case where there is a possibility that the clock to be inputted to the clock input terminal 10 includes noises at the time of the return after the stop command, a counting means different from the counting means 31 is used to invert the stop signal STP$_1$ slightly later than the stop signal STP, thereby to supply a clock free from noises to the CPU 1.

Next, an operation will be explained with respect to a case in which the operation of the CPU 1 is suspended without suspending the oscillation operation and the wait command is executed for reducing the power consumption as much as possible, together with a timing chart of signals at each part shown in FIG. 5.

The wait state selection signal $S_W$ is a signal for selecting whether or not the clock $f_2$ and the clocks $f_i$ . . . $f_k$, $f_{WDT}$ outputted by the frequency demultiplying circuit 30 are outputted in the wait state. When the signal $S_W$ is on the L-level, these clocks $f_2$, $f_i$ . . . $f_k$, $f_{WDT}$ are outputted, whereas the clocks are not outputted if the signal $S_W$ is on the H-level. When these clocks are not outputted, the power consumption is reduced in the wait state. However, the peripheral circuits 2 . . . 2 become inactive. Therefore, in a case where the peripheral circuits 2 . . . 2 are required to be operated in the wait state, it is necessary to turn the wait state selection signal $S_W$ to the L-level to output divided clocks $f_i$ . . . $f_k$.

Immediately after the CPU 1 executes the wait command, the wait signal WIT is changed to the H-level. Immediately after an interruption demand is generated from outside, the wait signal WIT is turned to the L-level.

In a case where the wait state selection signal $S_W$ is on the L-level, and the wait signal WIT is on the H-level, the output of the NOR circuit 22 is L-level, so that the AND circuit 18 shuts the inputted clock $f_2$ thereby suspending the supply of the clock $\phi$ to the CPU 1. Since the output #WIT$_1$ of the NAND circuit 20 is on the H-level in this case, the AND circuit 16 outputs the clock $\phi_x$. Consequently, the ½ frequency demultiplier 17 outputs the clock $f_2$ and inputs to the frequency demultiplying circuit 30. Then the divided clocks $f_i$ . . . $f_k$ are supplied to the peripheral circuits 2 . . . 2, never suspending the operation of the peripheral circuits 2 . . . 2.

In a case where the wait state selection signal $S_W$ is on the H-level, the output #WIT$_1$ of the NAND circuit 20 is on the L-level in the wait state, and the AND circuit 16 does not output the clock $\phi_x$, the clock $f_2$ is not inputted to the frequency demultiplying circuit 30. As the result the operation of the peripheral circuits 2 ... 2 is suspended. Further, since the clock $f_2$ is not outputted, the operation of the CPU 1 is suspended.

FIG. 6 is a block diagram showing a structure of a register for storing either the wait state selection signal $S_W$ or the stop return selection signal $S_S$. A reading signal RD outputted from the CPU is inputted to one input terminal of an AND circuit 104, while a writing signal WR is inputted to one input terminal of an AND circuit 103. An address bus 112 is connected to an input terminal of an address decoder 102 which detects detecting an address of a register to which a selection bit is assigned. An output terminal of the address decoder 102 is connected to the other input terminal of each of the AND circuits 103 and 104. An output terminal of the AND circuit 104 is connected to a control terminal of a tri-state buffer 105. An output terminal of the AND circuit 103 is connected to a trigger terminal T of a D flip-flop 101. An output terminal Q of the D flip-flop 101 is connected to an input terminal of the tri-state buffer 105. An output terminal of the tri-state buffer 105 is connected to a data bus 110. In addition, an output signal from the output terminal Q is used as the wait state selection signal $S_W$ or the stop return selection signal $S_S$. Consequently, it becomes possible for the CPU to appropriately read and write data of these selection bits.

Both FIG. 7 and FIG. 8 are block diagrams showing another structure of the conventional microcomputer. In FIG. 7, the clock input terminal 10 is connected to one input terminal of the NAND circuit 12, and one input terminal of a NAND circuit 13 smaller in size than the NAND circuit 12. The inversion stop signal #STP is input to the other input terminal of the NAND circuit 12 and the other input terminal of the NAND circuit 13. An output terminal of the NAND circuit 12 is connected to the clock output terminal 11. An output terminal of the NAND circuit 13 is connected to the input terminal of the Schmidt trigger circuit 14. The other points in the structure is the same as in FIG. 1. Like parts are denoted by like numerals. This microcomputer MC can input to the Schmidt trigger circuit 14 a clock of sine waves having little distortion in waveform which clock is given to the clock input terminal 10 at the time of the self-excited oscillation.

In FIG. 8, the clock input terminal 10 is connected to an input terminal of a clocked inverter 40. An output terminal of the clocked inverter 40 is connected to the clock output terminal 11 and the input terminal of the Schmidt trigger circuit 14. Further, the input terminal of the Schmidt trigger circuit 14 is connected to a power source $V_C$ via a P-channel MOS transistor 41. The inversion stop signal #STP is inputted to a control terminal of the clocked inverter 40 and a gate of the P-channel MOS transistor 41. The other points in structure is the same as in FIG. 1. Like parts are denoted by like numerals.

With this microcomputer, when the stop signal STP is on the L-level and the inversion stop signal #STP is on the H-level, the clocked inverter 40 can transmit a signal whereby the P-channel MOS transistor 41 is turned off and the external oscillation circuit 88 is oscillated and operated. In the meantime, in a case where the inversion stop signal #STP is on the L-level, the clocked inverter 40 forms a floating output and the P-channel MOS transistor 41 is turned on to output so that the voltage of the power source $V_C$ is sent to the clock output terminal 11.

All these microcomputers operate in the same way as the microcomputer shown in FIG. 1. A microcomputer MC having the feedback resistance 82 incorporated therein is also known in addition to the microcomputers in the above.

In the conventional microcomputer having the NAND circuit 12, the NAND circuit 12 is always operated when the stop command is not executed. Since the NAND circuit 12 is required to drive the external oscillation circuit 88, the MOS transistors constituting the NAND circuit 12 are designed to be considerably larger in size than other transistors. Consequently, the consumed power of the NAND circuit 12 is large. The consumed power results from a current due to charging/discharging a drain capacity of the transistors constituting the NAND circuit 12 and a capacity present at a pad of the clock output terminal 11 and a lead terminal and, a through current of the NAND circuit 12. The larger the size of the transistors of the NAND circuit 12 is, the more the power is consumed. When a clock with a stable frequency is supplied to the clock input terminal 10 from outside, there arises a problem in that the NAND circuit 12 consuming a large amount of power is not necessary, and the power is consequently wasted.

Further, in any of the microcomputers described above, if the clock is inputted to the clock input terminal 10 from the outside, the external oscillation circuit 88 is not required, and the clock output terminal 11 is held in an open state. The clock output terminal 11 is not effectively used. In addition, even when both the wait state selection signal $S_W$ and the wait signal WIT are set to the H-level into the wait state to shut the clock $\phi_x$ inputted to the AND circuit 16, and the operation of the CPU 1 and the peripheral circuits 2 ... 2 is suspended, the Schmidt trigger circuit 14 and the noise canceler 15 in the preceding stage of the AND circuit 16 are operated to output the clock $\phi_x$. The power is undesirably consumed in waste even in the wait state at the Schmidt trigger circuit 14 and the noise canceler 15 or as a result of charging/discharging of a wiring capacity between the Schmidt trigger circuit 14 and the noise canceler 15, etc.

SUMMARY OF THE INVENTION

The present invention has been made to solve the aforementioned problems. A main object of the present invention is to provide a microcomputer which can reduce the power consumption in a state in which a clock is input to a first clock terminal from outside and effectively use a second clock terminal, while consuming an extremely small amount of the power in a wait state suspending the operation of a CPU and peripheral circuits.

The microcomputer according to the present invention is characterized in that: a first signal which is a logical OR of an oscillation state selection signal and a stop signal is supplied to a first gate circuit thereby allowing a clock generating circuit to oscillate and operate; and the first gate circuit is able to transmit a signal when the first signal is on a first level, and is not able to transmit a signal when the first signal is on a second level. Consequently, when a clock not by the clock generating circuit is inputted to the first clock terminal, the power to be consumed is reduced.

Incidentally, the microcomputer is constituted so that the first gate circuit can be placed in a floating state. The microcomputer is provided with a third gate circuit which can be placed in the floating state and has an output terminal connected to the second clock terminal, so that the first signal is given to the first gate circuit and the third gate circuit. In this constitution, when the first signal is on the first level, the first gate circuit is in a state to be able to transmit a signal, and the third gate circuit is placed in the floating state. When the first signal is on the second level, the first gate circuit is in the floating state and the third gate circuit is placed in a state to be able to transmit the signal. The second clock terminal can be used as an output port other than for the clock.

Further, a fourth gate circuit which can be placed in the floating state is connected in parallel to the first gate circuit to be so constituted as to be able to select a driving efficiency at the time of driving the clock signal generating circuit. At the time of starting or resuming the driving, both the first gate circuit and the fourth gate circuit are operated, and one of the gate circuits is operated afterwards for generating the clock. In this manner, a period before the clock is stabilized is shortened and the power to be consumed can be reduced.

The clock is arranged to be supplied to the CPU via a sixth gate circuit. The sixth gate circuit transmits the clock a predetermined time later after the clock generating circuit starts or resumes the operation. As a consequence of this, only a stable clock is supplied to the CPU.

Besides, the clock may be supplied to the CPU (and peripheral circuits) on the basis of a logical AND of a wait signal and a wait state selection signal.

Further, in a case where an input terminal for inputting the oscillation state selection signal or an input terminal for inputting the wait state selection signal are provided, it is not required to store these signals.

The above and further objects and features of the invention will more fully be apparent from the following detailed description with the accompanying drawings.

BRIEF DESCRIPTION OF THE DRAWINGS

FIG. 12 is a block diagram showing a structure of an essential part of a microcomputer according to an embodiment 2 of the present invention.

DESCRIPTION OF THE PREFERRED EMBODIMENTS

The present invention will be detailed with respect to the drawings showing embodiments of the present invention.

Embodiment 1

Figure 9:
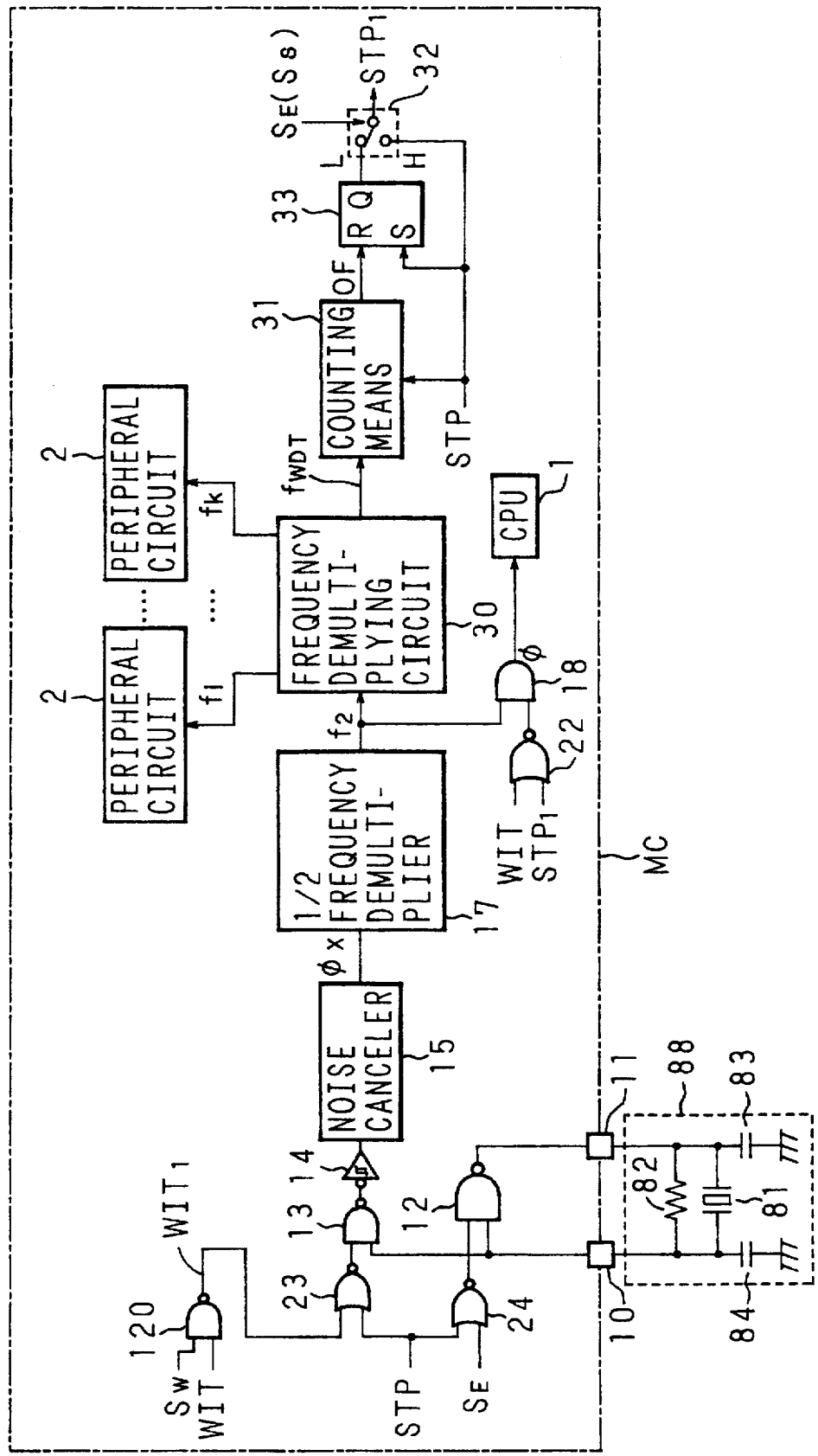
FIG. 9 is a block diagram showing a structure of an essential part in a microcomputer according to an embodiment 1 of the present invention.

FIG. 9 is a block diagram showing a structure of an essential part of a microcomputer according to an embodiment 1 of the present invention. A microcomputer MC is provided with external terminals, that is, a clock input terminal 10 and a clock output terminal 11. Between the clock input terminal 10 and the clock input terminal 11, a parallel circuit of a feedback resistance 82 and an oscillation element 81 made of a ceramic or quartz oscillator is provided. The clock input terminal 10 is grounded via a capacitor 84, while the clock output terminal 11 is grounded via a capacitor 83. The feedback resistance 82, the oscillation element 81 and the capacitors 83 and 84 constitute an external oscillation circuit 88. The clock input terminal 10 is connected to one input terminal of a NAND circuit 12 for oscillation (a first gate circuit) and one input terminal of a NAND circuit 13 (a seventh gate circuit) comprised of transistors smaller in size than transistors in the NAND circuit 12. An output terminal of the NAND circuit 12 is connected to the clock output terminal 11.

In a wait state in which the supply of a clock to a CPU and peripheral circuits is suspended without suspending the oscillation of the clock, a wait state selection signal $S_W$ for selecting a state in which the supply of the clock to the peripheral circuits is suspended, and a wait signal WIT for suspending the supply of the clock to the CPU and the peripheral circuits are inputted to an AND circuit 120 (logical AND gate circuit). An output terminal of the AND circuit 120 is connected to one input terminal of a NOR circuit 23. An oscillation state selection signal $S_E$ for selecting an oscillation state is inputted to one input terminal of a NOR circuit 24 (a second gate circuit), while an output terminal of the NOR circuit 24 is connected to the other input terminal of the NAND circuit 12. A stop signal STP for suspending the oscillation operation is inputted to the other input terminal of the NOR circuit 23 and the other input terminal of the NOR circuit 24. An output terminal of the NOR circuit 23 is connected to the other input terminal of the NAND circuit 13, and an output terminal of the NAND circuit 13 is connected to an input terminal of a Schmidt trigger circuit 14. An output terminal of the Schmidt trigger circuit 14 is connected to an input terminal of a noise canceler 15, while an output terminal of the noise canceler 15 is connected to an input terminal of a ½ frequency demultiplier 17 for dividing an input clock into half the frequency.

An output terminal of the ½ frequency demultiplier 17 is connected to one input terminal of an AND circuit 18 and an input terminal of a frequency demultiplying circuit 30. An output terminal of a NOR circuit 22 (a sixth gate circuit) is connected to the other input terminal of the NAND circuit 18. The wait signal WIT and a stop signal $STP_1$ are inputted to the NOR circuit 22. An output terminal of the AND circuit 18 is connected to a CPU 1. The frequency demultiplying circuit 30 outputs clocks $f_i \ldots f_k$ divided in frequency so as to conform to the peripheral circuits, to the peripheral circuits 2 ... 2. The frequency demultiplying circuit 30 inputs to a counting means 31 a specific clock $f_{WDT}$ appropriately divided in frequency to be counted thereat. An overflow signal OF outputted from the counting means 31 is inputted to a reset terminal R of an RS flip-flop 33.

An output terminal Q of the RS flip-flop 33 is connected to one switching terminal of a switching means 32. The stop signal STP is given to the counting means 31, a set terminal S of the RS flip-flop 33 and the other switching terminal of the switching means 32. The RS flip-flop 33 is set by the stop signal STP and is reset by the overflow signal OF outputted by the counting means 31. The switching means 32 is controlled and switched by an oscillation state selection signal $S_E$ selecting either a self-excited oscillation by the external oscillation circuit 88 or the clock input from outside without depending on the external oscillation circuit 88. In other words, when the oscillation state selection signal $S_E$ is on the L-level for selecting the self-excited oscillation, the switching means 32 is switched to the one switching terminal. In a case where the oscillation state selection signal $S_E$ is on the H-level for selecting the state for the clock to be input from outside, the switching means 32 is switched to the other switching terminal. Incidentally, the oscillation state selection signal $S_E$ is given by a register which is the same as that shown in FIG. 6.

Figure 10:
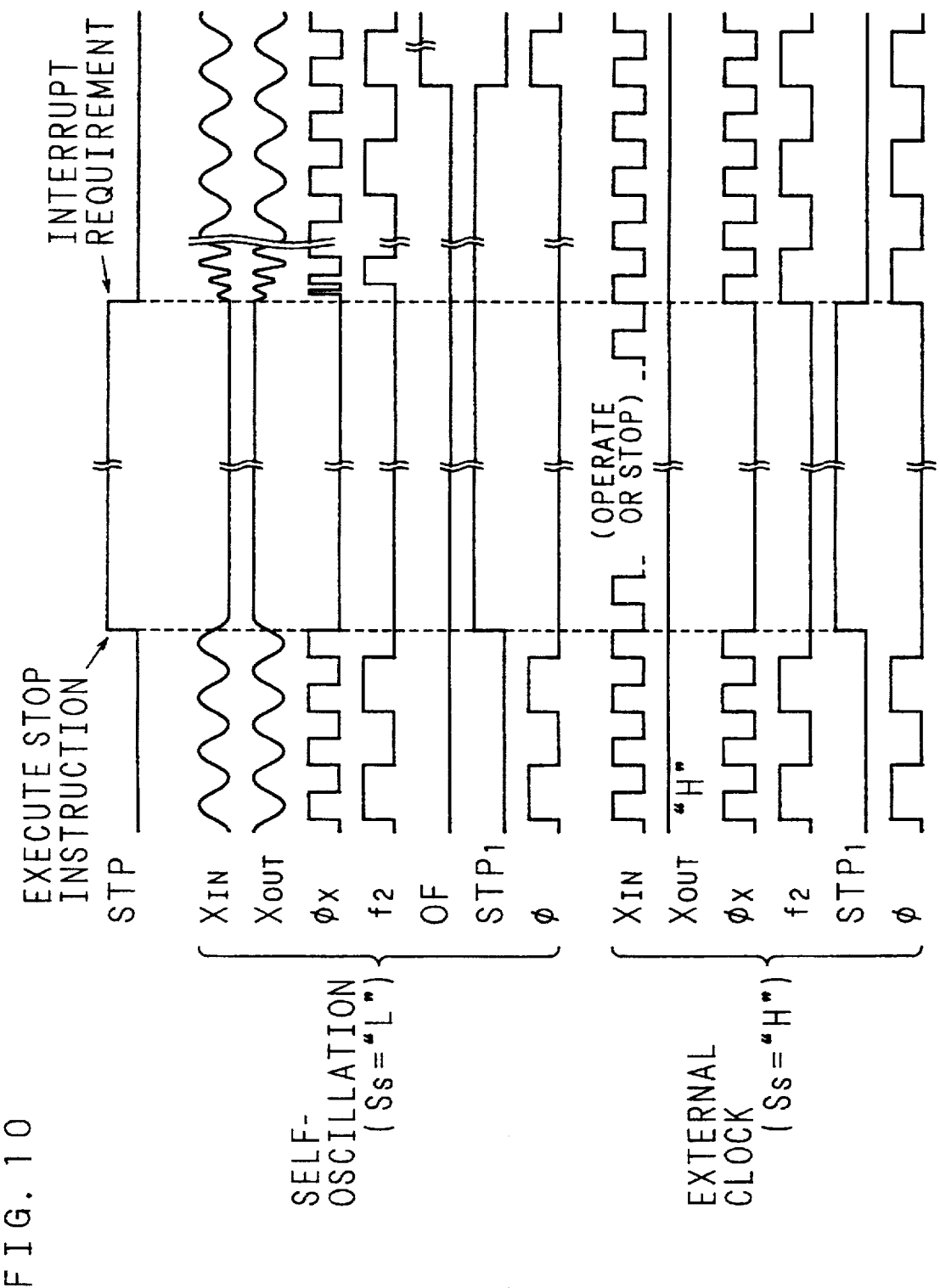
FIG. 10 is a timing chart of signals in each part according to the embodiment 1.
Figure 11:
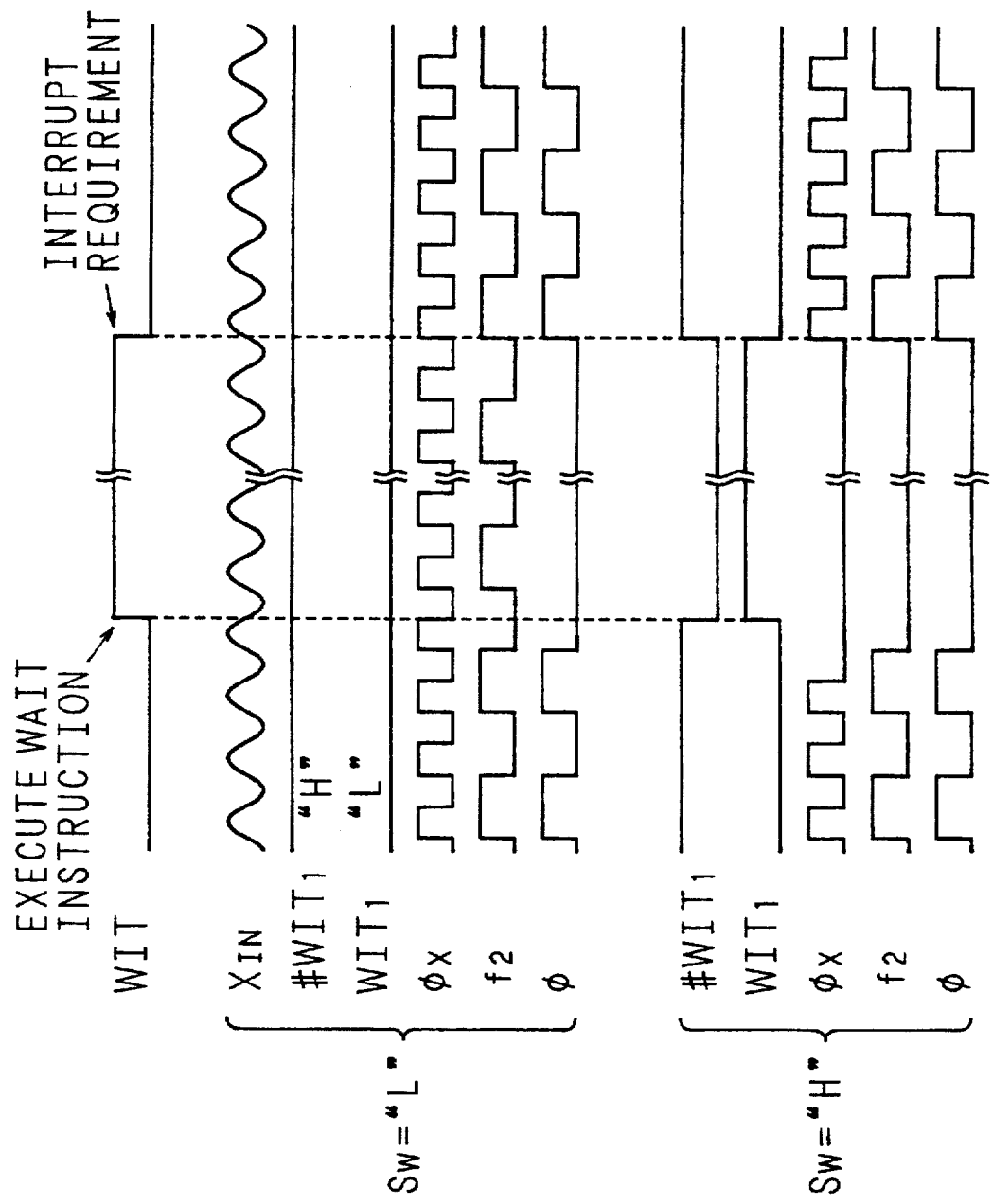
FIG. 11 is a timing chart of signals in each part according to the embodiment 1.

Next, an operation of the microcomputer constituted in this manner will be explained with respect to FIGS. 10 and 11 showing timing charts of each signal. When the oscillation operation of the external oscillating circuit 88 is not suspended, the stop signal STP is set to the L-level and the oscillation state selection signal $S_E$ is set to the L-level. Consequently, an output of the NOR circuit 24 is set to the H-level, and the NAND circuit 12 is placed in a state in which it is able to transmit a signal. As a consequence of this, the external oscillating circuit 88 for self-excited oscillation connected to the clock input terminal 10 and the clock output terminal 11 is oscillated and operated.

In the self-excited oscillation shown in FIG. 10, sine wave clocks $X_{IN}$ and $X_{OUT}$ with inverted phases are given to the clock input terminal 10 and the clock output terminal 11 respectively. Here, in a case where it is not a wait state suspending the supply of the clock to the CPU 1, the wait signal WIT is set to the L-level, and an output $WIT_1$ of the AND circuit 120 is on the L-level and the NOR circuit 23 outputs an H-level signal. Consequently, the NAND circuit 13 is placed in a state in which it is able to transmit a signal. The clock $X_{IN}$ of the sine wave given to the clock input terminal 10 is inputted to the Schmidt trigger circuit 14 via the NAND circuit 13, where the waveform of the sine wave clock $X_{IN}$ is shaped. Then the clock $X_{IN}$ is inputted to the noise canceler 15 so that the noise is removed by the noise canceler 15, and a clock $\phi_x$ which does not include a noise component is outputted from the noise canceler 15. The clock $\phi_x$ is inputted to the ½ frequency demultiplier 17 to be divided half in frequency. Then, a clock $f_2$ is inputted to the frequency demultiplying circuit 30. Then the clock $f_2$ is divided into clocks $f_i \ldots f_k$ which conform to the peripheral circuits 2 ... 2 before being supplied to the peripheral circuits 2 ... 2.

The specific clock $f_{WDT}$ outputted from the frequency demultiplying circuit 30 is inputted to the counting means 31. The counting means 31 counts the specific clock $f_{WDT}$ and outputs an overflow signal OF every time a predetermined count value is attained. The RS flip-flop 33 is reset by the overflow signal OF. A signal outputted from the output terminal Q of the RS flip-flop 33 is selected by the oscillation state selection signal $S_E$ which is on the L-level, and is outputted as a stop signal $STP_1$ from the switching means 32. When both the wait signal WIT and the stop signal $STP_1$ are on the L-level, the output of the NOR circuit 22 is on the H-level. At this time, the AND circuit 18 is in a state in which it is able to transmit a signal, and therefore the clock $f_2$ is supplied to the CPU 1 via the AND circuit 18. Then the CPU 1 is operated by the clock $\phi_x$ and the peripheral circuits 2 ... 2 are operated by the clocks $f_i \ldots f_k$ which are obtained by demultiplying the clock $f_2$.

Next, in a case where the stop signal STP is on the L-level, and the oscillation state selection signal $S_E$ is on the H-level while the circuit 88 is oscillated and operated, the output of the NOR circuit 24 is on the L-level, and the NAND circuit 12 is placed in a state in which it is not able to transmit a signal. Consequently, the output of the NAND circuit 12, namely the clock output terminal 11 is fixed on the H-level. In this case, if the clock $X_{IN}$ having a stable frequency is inputted to the clock input terminal 10 from outside, the output of the NOR circuit 23 remains H-level even when the NAND circuit 12 is placed in a state in which it is not able to transmit the signal. Consequently, the NAND circuit 13 is placed in a state in which it is able to transmit the signal and the clock $X_{IN}$ inputted to the clock input terminal 10 from outside is inputted to the Schmidt trigger circuit 14 via the NAND circuit 13. In this case, similar to the case where the external oscillation circuit 88 is oscillated and operated, the clock $f_2$ is inputted to the CPU 1 and the frequency demultiplying circuit 30, whereby the CPU 1 and the peripheral circuits 2 ... 2 are operated.

In this manner, when the oscillation state signal $S_E$ is on the H-level, the NAND circuit 12 is placed in a state in which it is not able to transmit the signal, and the clock inputted to the clock input terminal 10 from outside is inputted to the Schmidt trigger circuit 14 via the NAND circuit 13 having small size transistors. Consequently, the power consumption is largely reduced when the CPU 1 and the peripheral circuits 2 ... 2 are operated by the clock $X_{IN}$ inputted to the clock input terminal 10 from outside.

In a case where the stop signal STP is set on the H-level, both the output of the NAND circuit 12 and the output of the NAND circuit 13 are fixed on the H-level. At a time when this stop command is executed, inputting to the Schmidt trigger circuit 14 of the clock $X_{IN}$ inputted from outside is shut. If the external oscillating circuit 88 is oscillated and operated, the oscillation operation is stopped.

Further, as shown in FIG. 11, in a state in which the external oscillating circuit 88 is oscillated and operated while the wait state selection signal $S_W$ is on the L-level, when the stop signal STP is set to the L-level, and the wait signal WIT is set to the H-level thereby to execute a wait command, the output $WIT_1$ of the AND circuit 120 assumes the L-level and the output of the NOR circuit 23 assumes the H-level, with the result that the NAND circuit 13 becomes able to transmit the signal. Consequently, the clock $X_{IN}$ inputted to the clock input terminal 10 is fed to the Schmidt trigger circuit 14, and the clock $\phi_x$ is outputted from the noise canceler 15. Although the clock $f_2$ is output from the ½ frequency demultiplier 17, the output of the NOR circuit 22 becomes L-level because of the wait signal WIT on the H-level, whereby the AND circuit 18 is changed into a state in which it is unable to transmit the signal. As a result, the supply of the clock φ to the CPU 1 is suspended.

Meanwhile, in the wait state with holding the wait state selection signal $S_W$ on the H-level, the output WIT, of the AND circuit 120 is on the H-level, and accordingly the output of the NOR circuit 23 is on the L-level, turning the NAND circuit 13 into a state in which it is not able to transmit the signal. The clock from the clock input terminal 10 is consequently shut and the clocks $\phi_x$, φ are suspended, whereby the CPU 1 and the peripheral circuits 2 . . . 2 are rendered inactive. If both the stop signal STP and the oscillation state selection signal $S_E$ are on the L-level even when the output WIT$_1$, of the AND circuit 120 is on the H-level, the NAND circuit 12 is in the transmissible state, so that the external oscillation circuit 88 is oscillated.

Consequently, in the wait state where the wait state selection signal $S_W$ is on the H-level, the clock is not supplied to the Schmidt trigger circuit 14, the noise canceler 15 and a wiring part between the Schmidt trigger circuit 14 and the noise canceler 15, thereby reducing the power consumption.

Further, in a particular case where the oscillation state selection signal $S_E$ is set to the H-level to input the clock from outside to the clock input terminal 10, neither the NAND circuit 12 nor the NAND circuit 13 are in the transmissible state in the wait state and therefore, the clock $\phi_x$ and the clock φ are suspended, similar to the case in which the oscillation operation of the external oscillating circuit 88 is suspended.

In order to resume the oscillation operation from the suspended state, a stop return selection signal $S_S$ is set to the L-level so that the output terminal Q of the RS flip-flop 33 is selected by the switching means 32. As a result, the stop signal STP$_1$ is set to the L-level and the oscillation operation can be restored. Since this stop return selection signal $S_S$ and the oscillation state selection signal $S_E$ are signals on the basis of the condition that the clock is inputted from outside, any of the signals will do functionally.

Embodiment 2

Figure 12:
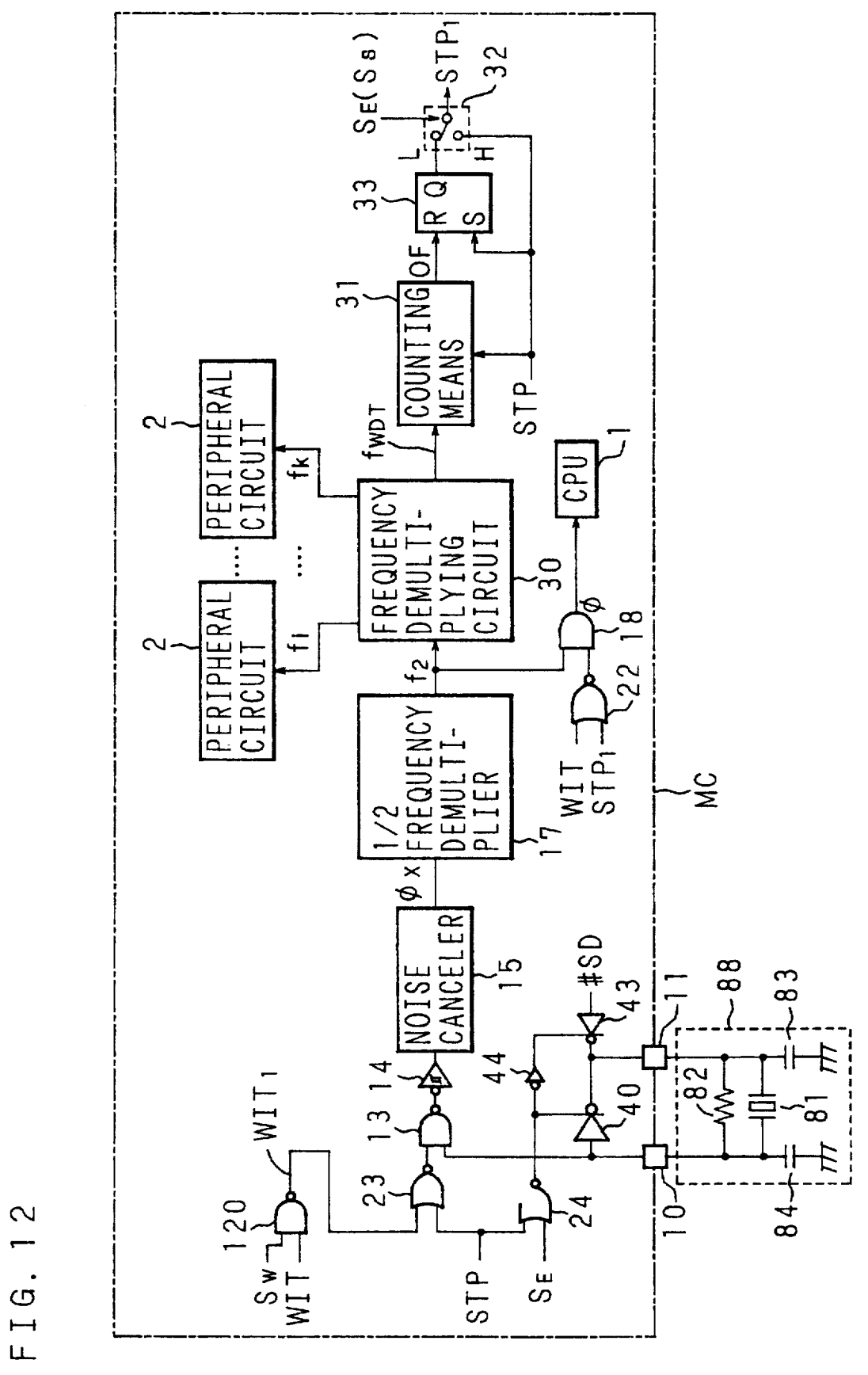

FIG. 12 is a block diagram showing a structure of an essential part of a microcomputer according to an embodiment 2 of the present invention. The clock input terminal 10 is connected to an input terminal of a clocked inverter 40 for oscillation which has an output terminal connected to the clock output terminal 11 and an output terminal of a clocked inverter 43 (a third gate circuit) for outputting of data. The output terminal of the NOR circuit 24 is connected to a control terminal of the clocked inverter 40 and an input terminal of an inverter 44. An output terminal of the inverter 44 is connected to a control terminal of the clocked inverter 43. To an input terminal of the clocked inverter 43 is inputted a reverse terminal state selection signal #SD. The other points in structure are the same as in FIG. 9. Like constituent parts are denoted by like numerals.

An operation of the microcomputer constituted in this manner will be explained. The stop signal STP and the oscillation state selection signal $S_E$ are set to the L-level so that the output of the NOR circuit 24 is set to the H-level, and the clocked inverter 40 becomes able to transmit the signal. Consequently, the clocked inverter 43 is set into the floating state, so that the external oscillating circuit 88 is oscillated and operated.

In the meantime, when the stop signal STP is set to the H-level, the output of the NOR circuit 24 is set to the L-level, whereby the clocked inverter 40 is set to the floating state. As a consequence of this, the clocked inverter 43 becomes able to transmit the signal and a terminal state selection signal SD obtained by inverting the reverse terminal state selection signal #SD is outputted to the clock output terminal 11. The reverse terminal state selection signal #SD is output to a register similar to that shown in FIG. 6. Incidentally, the microcomputer operates in the same way other than the above as the microcomputer shown in FIG. 9.

In a case where the clock is inputted to the clock input terminal 10 from outside in the microcomputer, when the oscillation state selection signal $S_E$ is set to the H-level, the CPU 1 and the peripheral circuits 2 . . . 2 are operated by the clock inputted from outside. In addition, the terminal state selection signal SD obtained by reversing the reverse terminal state selection signal #SD is outputted to the clock output terminal 11. Consequently, the clock output terminal 11 can be used as an output port other than for the clock, that is, the terminal can be effectively used.

Figure 13:
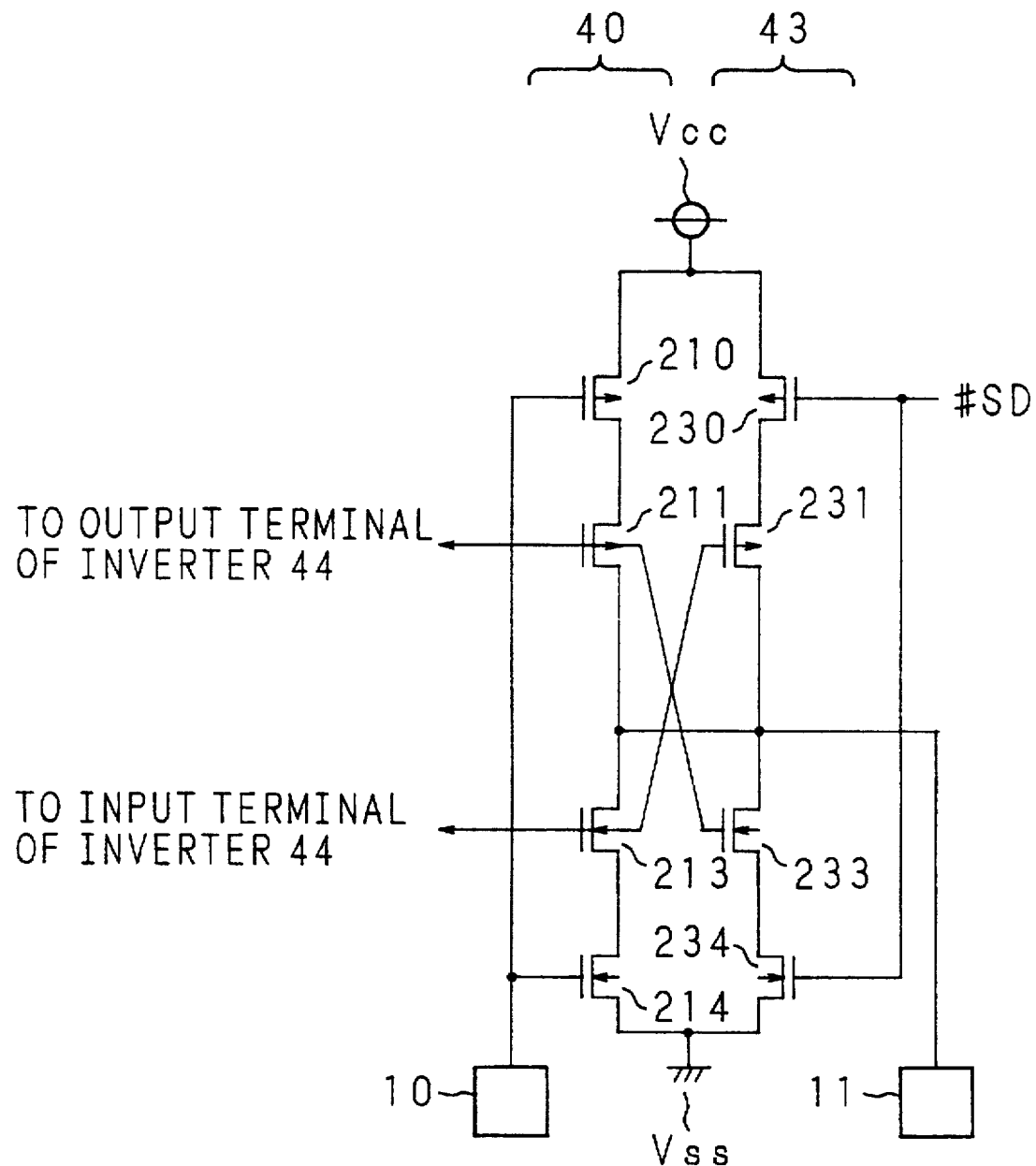
FIG. 13 is a block diagram showing a structure of a clocked inverter shown in FIG. 12.

FIG. 13 is a block diagram in a case in which the clocked inverters 40 and 43 shown in FIG. 12 are constituted of MOS transistors. Between a power source $V_{CC}$ and a ground power source $V_{SS}$, a series circuit of P-channel transistors 210 and 211 and N-channel transistors 213 and 214 is connected and also a series circuit of P-channel transistors 230 and 231 and N-channel transistors 233 and 234 is interposed. A gate of each of the transistors 210 and 214 is connected to the clock input terminal 10. Gates of the P-channel transistor 211 and the N-channel transistor 233 are connected to the output terminal of the inverter 44 (see FIG. 12). Gates of the N-channel transistor 213 and the P-channel transistor 231 are connected to the input terminal of the inverter 44 (see FIG. 12). The reverse terminal state selection signal #SD is inputted to each gate of the transistors 230 and 234. A connecting part between the P-channel transistor 211 and the N-channel transistor 213 and a connecting part between the P-channel transistor 231 and the N-channel transistor 233 are connected in common to the clock output terminal 11.

The clocked inverter 40 is constituted of the P-channel transistors 210 and 211 and N-channel transistors 213 and 214, and the clocked inverter 43 is constituted of the P-channel transistors 230 and 231 and the N-channel transistors 233 and 234.

Incidentally, in the embodiments 1 and 2 shown in FIGS. 9 and 12, the wait state selection signal $S_W$ and the wait signal WIT are inputted to the AND circuit 120. However, the wait signal WIT may be directly inputted to the NOR circuit 23 so that the supply of the clock to the CPU 1 and the peripheral circuits 2 . . . 2 is shut in the wait state without using the AND circuit 120 and the wait state selection signal $S_W$.

Embodiment 3

Figure 14:
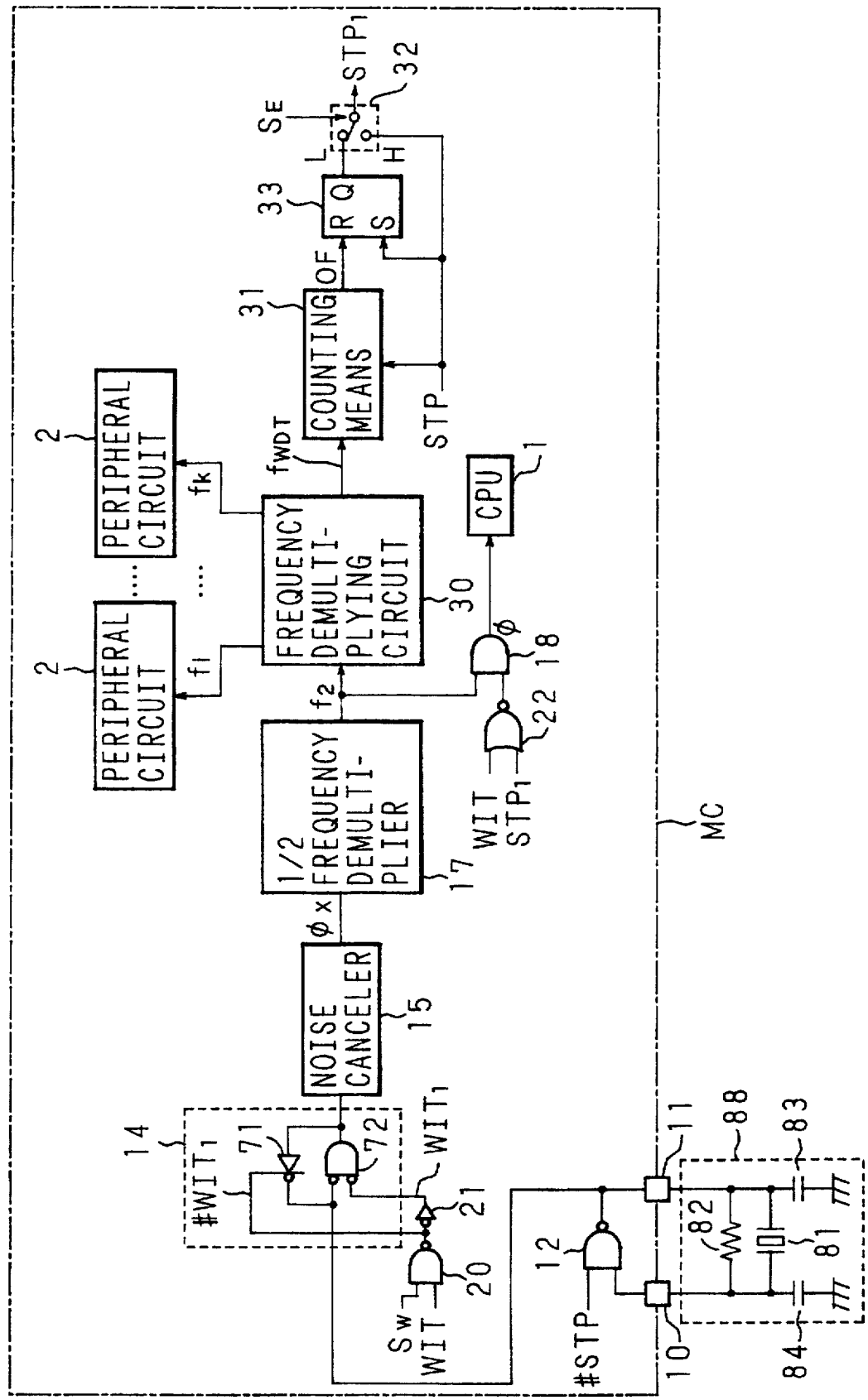
FIG. 14 is a block diagram showing a structure of an essential part of a microcomputer according to an embodiment 3 of the present invention.

FIG. 14 is a block diagram showing a structure of an essential part of a microcomputer according to an embodiment 3 of the present invention. The clock input terminal 10 is connected to one input terminal of the NAND circuit 12. The inversion stop signal #STP is input to the other input terminal of the NAND circuit 12. The output terminal of the NAND circuit 12 is connected to the clock output terminal 11 and one input terminal of a NOR circuit 72 and an output terminal of a clocked inverter 71. An output terminal of the NOR circuit 72 is connected to the input terminal of the noise canceler 15 and an input terminal of the clocked inverter 71. The wait state selection signal $S_W$ and the wait signal WIT are inputted to the NAND circuit 20. The output terminal of the NAND circuit 20 is connected to an input terminal of an inverter 21 and a control terminal of the clocked inverter 71. An output terminal of the inverter 21 is connected to the other input terminal of the NOR circuit 72. The other points in structure of the embodiment 3 are the same as in FIG. 9. Like constituent parts are denoted by like numerals. Incidentally, the clocked inverter 71 and the NOR circuit 72 constitute the Schmidt trigger circuit 14.

Next, an operation of the microcomputer will be explained. When the circuit 88 is to be oscillated and operated, the stop signal STP is set to the L-level, namely the inversion stop signal #STP is set to the H-level. Consequently, the NAND circuit 12 is placed in a state in which it is able to transmit the signal, and the sine wave clock of the clock input terminal 10 is inputted to one input terminal of the NOR circuit 72 in the Schmidt trigger circuit 14 via the NAND circuit 12. Further, in a case where the microcomputer is not in the wait state, the wait signal WIT is set to the L-level. Consequently, the output of the NAND circuit 20 is set to the H-level, and the output $WIT_1$ of the inverter 21 is set to the L-level to be inputted to the other input terminal of the NOR circuit 72. Further, the clocked inverter 71 is changed to a state in which it is able to transmit a signal, with the result that the Schmidt trigger circuit 14 shapes the waveform of the clock inputted from the NAND circuit 12. Then, the clock outputted from the Schmidt trigger circuit 14 is inputted to the noise canceler 15.

Then, in the same manner as described above, the clock $f_2$ is outputted from the ½ frequency demultiplier 17 to be supplied to the CPU 1 and to the peripheral circuits 2 . . . 2 through the frequency demultiplying circuit 30, so that the CPU 1 and the peripheral circuits 2 . . . 2 are operated.

In the meantime, when both the wait state selection signal $S_W$ and the wait signal WIT are set to the H-level, the output of the NAND circuit 20 is set to the L-level and the clocked inverter 71 constitutes a floating output. On the other hand, the output of the inverter 21 is set to the H-level and the output of the NOR circuit 72 is fixed to the L-level, thus preventing the sine wave clock outputted from the NAND circuit 12 from being inputted to the noise canceler 15. In consequence, the clock $f_2$ is not outputted from the ½ frequency demultiplier 17 and the supply of the clock to the CPU 1 and the peripheral circuits 2 . . . 2 is interrupted. The CPU 1 and peripheral circuits 2 . . . 2 are not operated. Consequently, when the microprocessor is set in the wait state, the clock is not supplied to the noise canceler 15, the ½ frequency demultiplier 17 and a wiring part connecting the noise canceler 15 and the ½ frequency demultiplier 17 while in the oscillation operation, with the result that the power to be consumed is reduced.

Incidentally, the embodiment 3 operates in the same way except the above as the microcomputer shown in FIG. 9.

Embodiment 4

Figure 15:
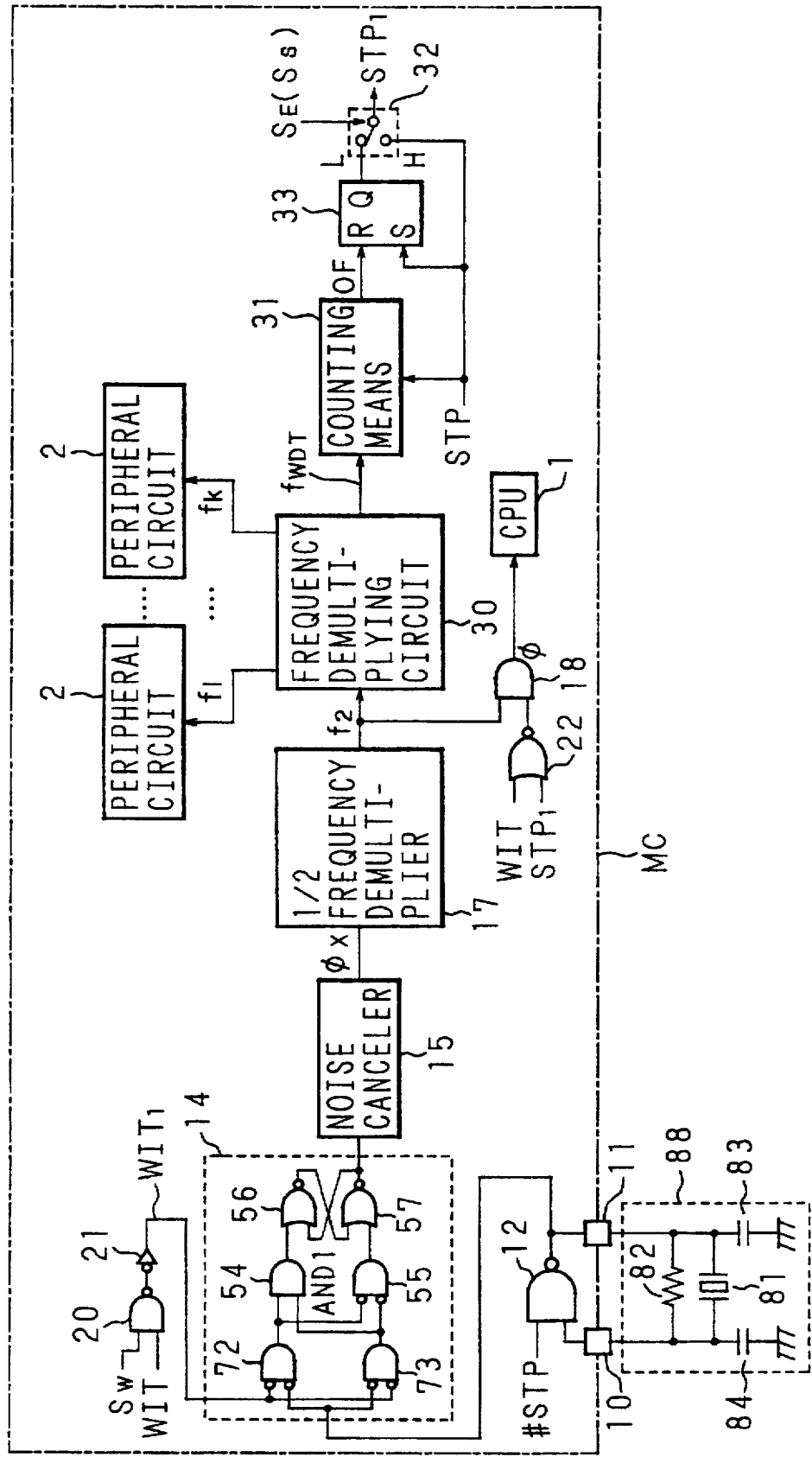
FIG. 15 is a block diagram showing a structure of an essential part of a microcomputer according to an embodiment 4 of the present invention.

FIG. 15 is a block diagram showing a structure of an essential part of a microcomputer according to an embodiment 4 of the present invention. The output terminal of the NAND circuit 12 is connected to the clock output terminal 11, and one input terminal of each of the NOR circuit 72 and a NOR circuit 73. The wait state selection signal $S_W$ and the wait signal WIT are inputted to the NAND circuit 20. The output terminal of the NAND circuit 20 is connected to the other input terminal of the NOR circuit 72 and the other input terminal of the NOR circuit 73 via the inverter 21. The output terminal of the NOR circuit 72 is connected to one input terminal of an AND circuit 54 and one input terminal of a NOR circuit 55. An output terminal of the NOR circuit 73 is connected to the other input terminal of the AND circuit 54 and the other input terminal of the NOR circuit 55. An output terminal of the AND circuit 54 is connected to one input terminal of a NOR circuit 56, while an output terminal of the NOR circuit 55 is connected to one input terminal of a NOR circuit 57.

An output terminal of the NOR circuit 56 is connected to the other input terminal of the NOR circuit 57 which has an output terminal connected to the other input terminal of the NOR circuit 56 and the input terminal of the noise canceler 15. Then, the NOR circuits 72 and 73, the AND circuit 54, the NOR circuits 55, 56 and 57 constitute the Schmidt trigger circuit 14. The other points in structure of the embodiment 4 are the same as shown in FIG. 14. Like constituent parts are denoted by like numerals.

Next, an operation of this microcomputer will be explained. In a case where the circuit 88 is to be oscillated and operated, the stop signal STP is set to the L-level, and the inversion stop signal #STP is set to the H-level. Consequently, the NAND circuit 12 is placed in a state in which it is able to transmit the signal, so that the sine wave clock of the clock input terminal 10 is inputted to one input terminal of the NOR circuit 72 and one input terminal of the NOR circuit 73 in the Schmidt trigger circuit 14 via the NAND circuit 12.

Incidentally, when the microprocessor is not in the wait state, the wait signal WIT is set to the L-level. Consequently, the output of the NAND circuit 20 is set to the H-level, and the output $WIT_1$ of the inverter 21 is set to the L-level. The NOR circuits 72 and 73 are placed in a state in which it is able to transmit the signal, so that the sine wave clock outputted from the NAND circuit 12 is outputted from the NAND circuits 72 and 73. Then, if both outputs of the NAND circuits 72 and 73 are on the H-level, the output of the AND circuit 54 is set to the H-level. In a case where both outputs of the NAND circuits 72 and 73 are set to the L-level, the output of the NOR circuit 55 is set to the H-level. Consequently, both outputs of the NOR circuits 56 and 57 are turned to the L-level, and the output of the Schmidt trigger circuit 14 becomes L-level. Further, in a case where the output of the NAND circuit 12 is set to the L-level, the output of the Schmidt trigger circuit 14 becomes H-level. In other words, the sine wave clock outputted from the NAND circuit 12 and shaped thereafter in waveform is outputted to be inputted to the noise canceler 15, with the result that the clock $\phi_x$ from which a noise component is removed is outputted from the noise canceler 15. Consequently, in the case where the microcomputer is not in the wait state, the clock $f_2$ is supplied to the CPU 1 and the clocks $f_i \ldots f_k$ are supplied to the peripheral circuits 2 . . . 2 as described above, so that the CPU 1 and peripheral circuits 2 . . . 2 are operated.

In the meantime, when the wait state selection signal $S_W$ and the wait signal WIT are set to the H-level, the output of the NAND circuit 20 is set to the L-level, and the output $WIT_1$ of the inverter 21 is set to the H-level. Consequently, the NOR circuits 72 and 73 are placed in a state in which it is not able to transmit the signal. Respective outputs of the NOR circuits 72 and 73 are fixed to the L-level. Consequently, the sine wave clock outputted from the NAND circuit 12 is prevented from being inputted to the noise canceler 15. Since the clock $f_2$ is not outputted from the ½ frequency demultiplier 17, the CPU 1 and the peripheral circuits 2 . . . 2 are not operated as described above. If the microcomputer is placed in the wait state in this case, the clock is not supplied to the noise canceler 15, the ½ frequency demultiplier 17 and a wiring part which connects the noise canceler 15 and the ½ frequency demultiplier 17 while in the oscillation operation, so that the power consumption can be reduced.

Embodiment 5

Figure 16:
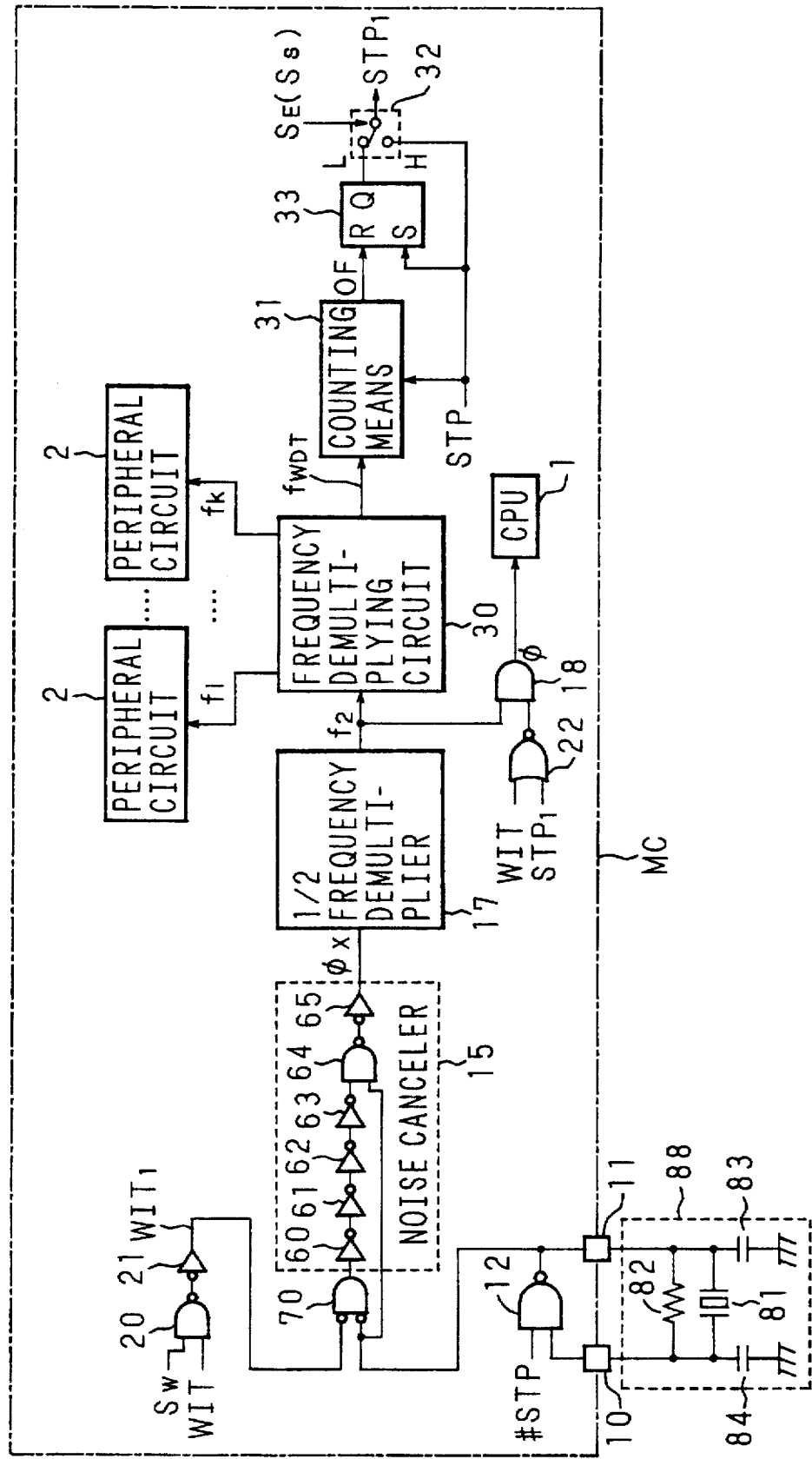
FIG. 16 is a block diagram showing a structure of an essential part of a microcomputer according to an embodiment 5 of the present invention.

FIG. 16 is a block diagram showing a structure of an essential part of a microcomputer according to an embodiment 5 of the present invention. The clock input terminal 10 is connected to one input terminal of the NAND circuit 12. The output terminal of the NAND circuit 12 is connected to the clock output terminal 11, one input terminal of a NOR circuit 70, and one input terminal of a NAND circuit 64. The inversion stop signal #STP is inputted to the other input terminal of the NAND circuit 12. The wait state selection signal $S_W$ and the wait signal WIT are input to the NAND circuit 20. The output terminal of the NAND circuit 20 is connected to the other input terminal of the NOR circuit 70 via the inverter 21. An output terminal of the NOR circuit 70 is connected to the other input terminal of the NAND circuit 64 via a series circuit of the inverters 60, 61, 62 and 63. An output terminal of the NAND circuit 64 is connected to the input terminal of the ½ frequency demultiplier 17 via the inverter 65. The inverters 60, 61, 62, 63 and 65 and the NAND circuit 64 constitute the noise canceler 15. The structure of the embodiment 5 is the same as in FIG. 15 in other points. Like constituent parts are denoted by like numerals.

Next, an operation of this microcomputer will be explained. In a case where the circuit 88 is to be oscillated and operated, the stop signal STP is set to the L-level, namely the inversion stop signal #STP is set to the H-level. Consequently, the NAND circuit 12 is placed in an operable state, so that the clock of the clock input terminal 10 is inputted to each one input terminal of the NOR circuit 70 and the NAND circuit 64 through the NAND circuit 12. Further, when the microcomputer is not in the wait state, the wait signal WIT is set to the L-level, whereby the output of the NAND circuit 20 is turned to H-level and the output $WIT_1$ of the inverter 21 is set to the L-level. Then when an L-level clock is inputted to one input terminal of the NOR circuit 70, the NOR circuit 70 outputs an H-level clock. This clock is sequentially inverted at the inverters 60, 61, 62 and 63 and set to the H-level to be inputted to the other input terminal of the NAND circuit 64. The H-level clock is outputted from the NAND circuit 64, and then inverted at the inverter 65 to be L-level. In this manner, the clock $\phi_x$ from which noises are removed is inputted to the ½ frequency demultiplier 17.

When an H-level clock is inputted to one input terminal of the NOR circuit 70, an L-level clock is outputted from the NOR circuit 70 and is sequentially inverted by the inverters 60, 61, 62, 63 to be the L-level. The clock is inputted to the other input terminal of the NAND circuit 64 which in turn outputs the L-level clock. The clock is further inverted at the inverter 65 to be set to the H-level. The clock $\phi_x$ with noises removed in this manner is inputted to the ½ frequency demultiplier 17. Then, in the same manner as described above, the clock $f_2$ is outputted from the ½ frequency demultiplier 17. The clock is supplied to the CPU 1 and the peripheral circuits 2 . . . 2 thereby driving both the CPU 1 and the peripheral circuits 2 . . . 2.

In the meantime, when the wait state selection signal $S_W$ and the wait signal WIT are both set to the H-level, the output of the NAND circuit 20 is set to the L-level and the output $WIT_1$ of the inverter 21 is set to the H-level. Consequently, the output of the NOR circuit 70 is fixed to the L-level, and the output of the NAND circuit 64 is fixed to the H-level. Thus, the clock outputted from the NAND circuit 12 is interrupted to be inputted to the ½ frequency demultiplier 17, with the result that the clock $f_2$ is not outputted, and the operation of the CPU 1 and the peripheral circuits 2 . . . 2 is suspended. In this case alike, if the microcomputer is placed in the wait state, the supply of the clock to the noise canceler 15 and the ½ frequency demultiplier 17 is suspended even during the oscillation operation and the operation of the noise canceler 15 and the ½ frequency demultiplier 17 is suspended. Thus the power to be consumed is reduced.

Embodiment 6

Figure 17:
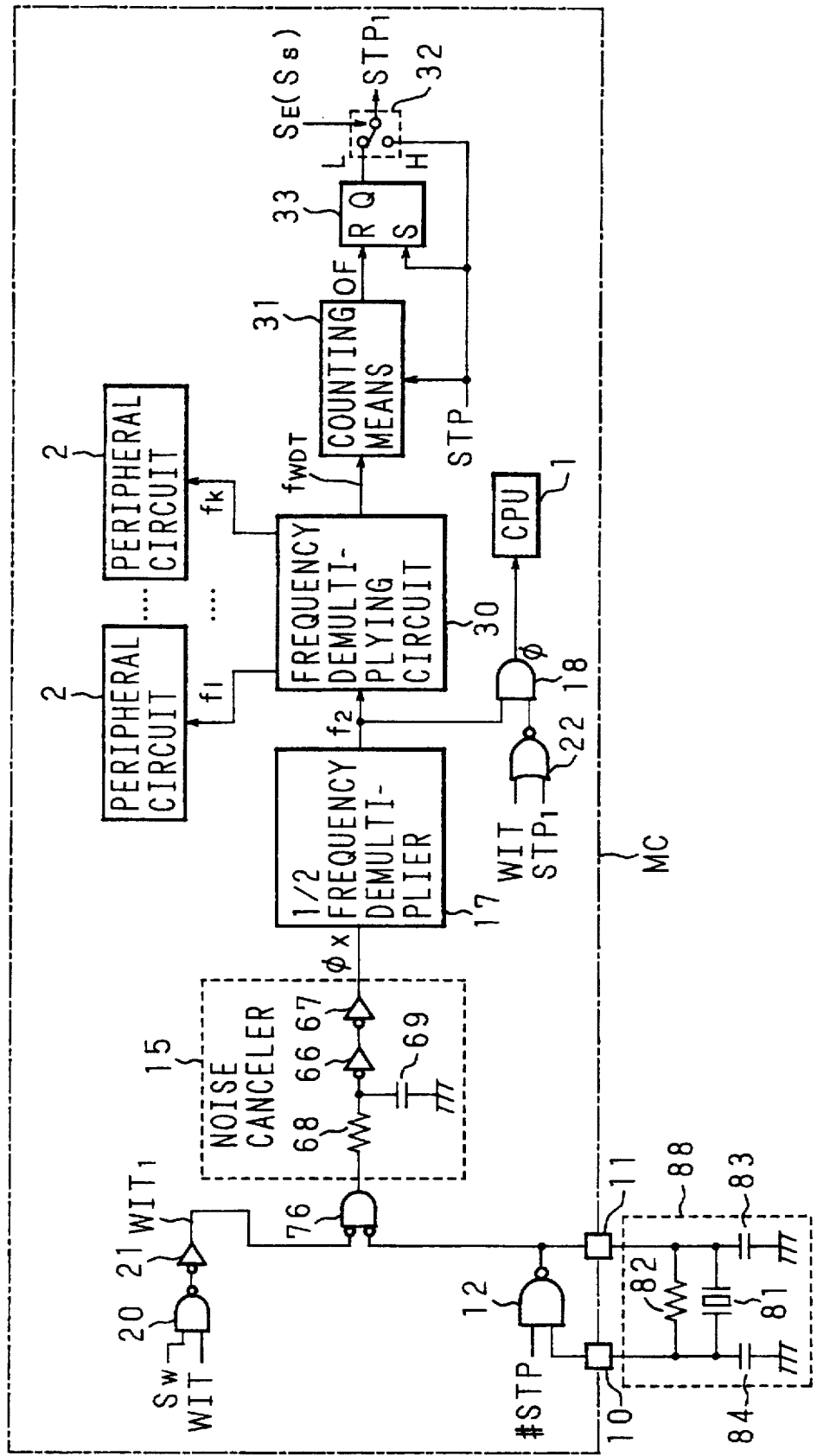
FIG. 17 is a block diagram showing a structure of an essential part of a microcomputer according to an embodiment 6 of the present invention.

FIG. 17 is a block diagram showing a structure of an essential part of a microcomputer according to an embodiment 6 of the present invention. The clock input terminal 10 is connected to one input terminal of the NAND circuit 12, while the output terminal of the NAND circuit 12 is connected to the clock output terminal 11 and one input terminal of a NOR circuit 76. The inversion stop signal #STP is input to the other input terminal of the NAND circuit 12. The wait state selection signal $S_W$ and the wait signal WIT are inputted to the NAND circuit 20. The output terminal of the NAND circuit 20 is connected to an input terminal of the inverter 21. An output terminal of the inverter 21 is connected to the other input terminal of the NOR circuit 76. An output terminal of the NOR circuit 76 is connected to the input terminal of the ½ frequency demultiplier 17 via a circuit of the resistance 68 and inverters 66 and 67 connected in series in this order. A connecting part between the resistance 68 and the inverter 67 is grounded via the capacitor 69. The resistance 68, the inverters 66 and 67, and the capacitor 69 constitute the noise canceler 15.

The other points in structure of the embodiment 6 are the same as in FIG. 15. Like constituent parts are denoted by like numerals.

Next, an operation of the microcomputer will be explained. In a case where the circuit 88 is to be oscillated and operated, the stop signal STP is set to the L-level, or the inversion stop signal #STP is set to the H-level. Consequently, the NAND circuit 12 is brought in a state in which it is able to transmit the signal, so that the clock of the clock input terminal 10 is inputted to one input terminal of the NOR circuit 76 via the NAND circuit 12. When the microcomputer is not placed in the wait state, the wait signal WIT is set to the L-level. Consequently, the output of the NAND circuit 20 is set to the H-level, and the output $WIT_1$ of the inverter 21 is set to the L-level. If the clock inputted to one input terminal of the NOR circuit 76 is on the L-level, the output becomes H-level. When the clock inputted to one input terminal of the NOR circuit 76 is set to the H-level, the output of the NOR circuit 76 is L-level. The clock outputted from the NOR circuit 76 is inputted to the ½ frequency demultiplier 17 after the noise components are removed by the noise canceler 15. Then, in the same fashion as described above, the clock $f_2$ is output from the ½ frequency demultiplier 17, so that the CPU 1 and the peripheral circuits 2 . . . 2 are operated.

In the meantime, when the wait state selection signal $S_W$ and the wait signal WIT are both set to the H-level, the output of the NAND circuit 20 is set to the L-level, and the output $WIT_1$ of the inverter 21 is set to the H-level.

Consequently, the output of the NOR circuit 76 is fixed to the L-level. Then, the inputting of the clock outputted from the NAND circuit 12 to the ½ frequency demultiplier 17 is shut, whereby the clock $f_2$ is not outputted and the operation of the CPU 1 and the peripheral circuits 2... 2 is suspended. Then, if the microcomputer is brought in the wait state in this case, the supply of the clock to the noise canceler 15 and the ½ frequency demultiplier 17 is suspended in the oscillation operation. With the operation of the noise canceler 15 and the ½ frequency demultiplier 17 being suspended, the power consumption is reduced.

Embodiment 7

Figure 18:
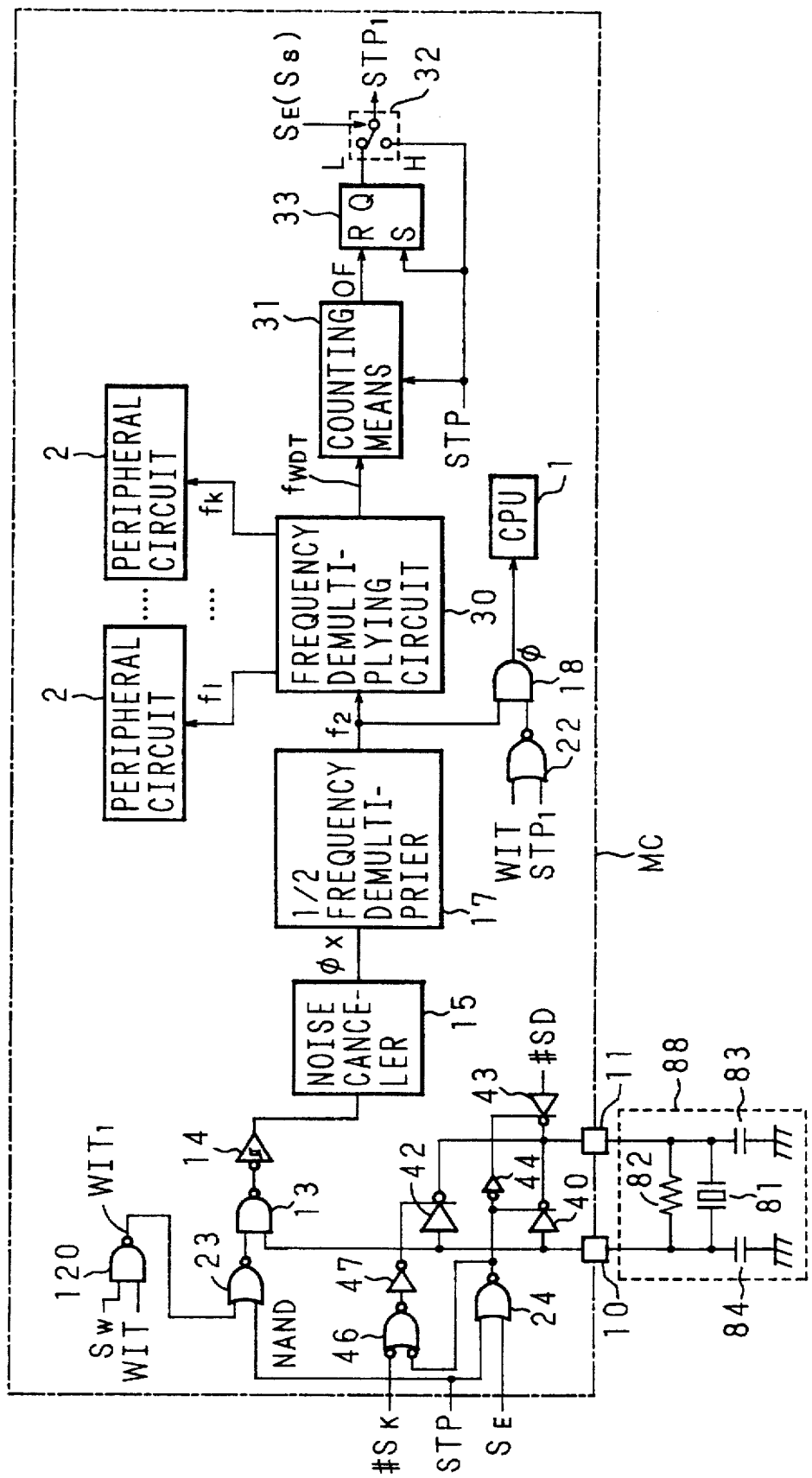
FIG. 18 is a block diagram showing a structure of an essential part of a microcomputer according to an embodiment 7 of the present invention.

FIG. 18 is a block diagram showing a structure of an essential part of a microcomputer according to an embodiment 7 of the present invention. The clock input terminal 10 is connected to input terminals of the clocked inverter 40 and a clocked inverter 42 (a fourth gate circuit) and to one input terminal of the NAND circuit 13. Output terminals of the clocked inverters 40 and 42 are connected to the clock output terminal 11 and the output terminal of the clocked inverter 43. The inversion terminal state selection signal #SD is inputted to the input terminal of the inverter 43.

The stop signal STP and the oscillation state selection signal $S_E$ are inputted to the NOR circuit 24. The output terminal of the NOR circuit 24 is connected to one input terminal of a NAND circuit 46 (a fifth gate circuit), the input terminal of the inverter 44, and the control terminal of the clocked inverter 40. An inversion driving efficiency selection signal #$S_K$ is inputted to the other input terminal of the NAND circuit 46. An output terminal of the NAND circuit 46 is connected to an input terminal of an inverter 47 which has an output terminal connected to a control terminal of the clocked inverter 42. The output terminal of the inverter 44 is connected to the control terminal of the clocked inverter 43. The driving efficiency of the clocked inverter 42 is larger than that of the clocked inverters 40 and 43, and the driving efficiencies of the clocked inverters 40 and 43 are selected to be approximately equal each other.

Incidentally, the sum of the driving efficiency of the clocked inverters 40 and 42 in FIG. 18 is set to be the same as the driving efficiency of the clocked inverter 40 shown in FIG. 12.

The other points in structure are the same as shown in FIG. 12, and like constituent parts are denoted by like numerals.

Next, an operation of the microcomputer will be explained. An operation allowing a terminal state selection signal SD to be output to or not to be outputted to the clock output terminal 11 by the oscillation state selection signal $S_E$ is the same as the operation of the microcomputer shown in FIG. 12.

When both the oscillation state selection signal $S_E$ and the stop signal STP are set to the L-level and the inversion driving efficiency selection signal #$S_K$ is set to the H-level to increase the driving efficiency, the output of the NOR circuit 24 is set to the H-level and the output of the NAND circuit 46 is set to the L-level, and the output of the inverter 47 is set to the H-level. As a consequence, the clocked inverters 40 and 42 are placed in a state in which they are able to transmit a signal, and the output of the inverter 44 is set to the L-level. Consequently, the clocked inverter 43 exerts a floating output, and the external oscillation circuit 88 is driven with a larger driving efficiency by the clocked inverters 40 and 42, so that the oscillation operation is stabilized in a short time. When the oscillation operation is stabilized, as the inversion driving efficiency selection signal #$S_K$ is set to the L-level, the output of the NOR circuit 46 is set to the H-level and the output of the inverter 47 is set to the L-level, so that the clocked inverter 42 is placed in a floating output state, whereby the oscillation operation is continued by the clocked inverter 40 having a small driving efficiency.

In other words, it is possible to switch the microcomputer in two states, i.e., a large efficiency state and a small efficiency state. In the large efficiency state, two clocked inverters 40 and 42 are both set in a state in which they are able to transmit a signal depending on a state of the inversion driving efficiency selection signal #$S_K$. In the small efficiency state, only the clocked inverter 40 is placed in a state in which it is able to transmit a signal. Generally, the large driving efficiency is required when the power is supplied or when the oscillation operation is started, e.g., the oscillation operation is resumed from the suspended state. After the oscillation operation is stabilized, however, no large driving efficiency is necessary. Therefore, the clocked inverter 40 with a smaller driving efficiency is operated after the oscillation operation is stabilized, to reduce the power consumption.

Figure 19:
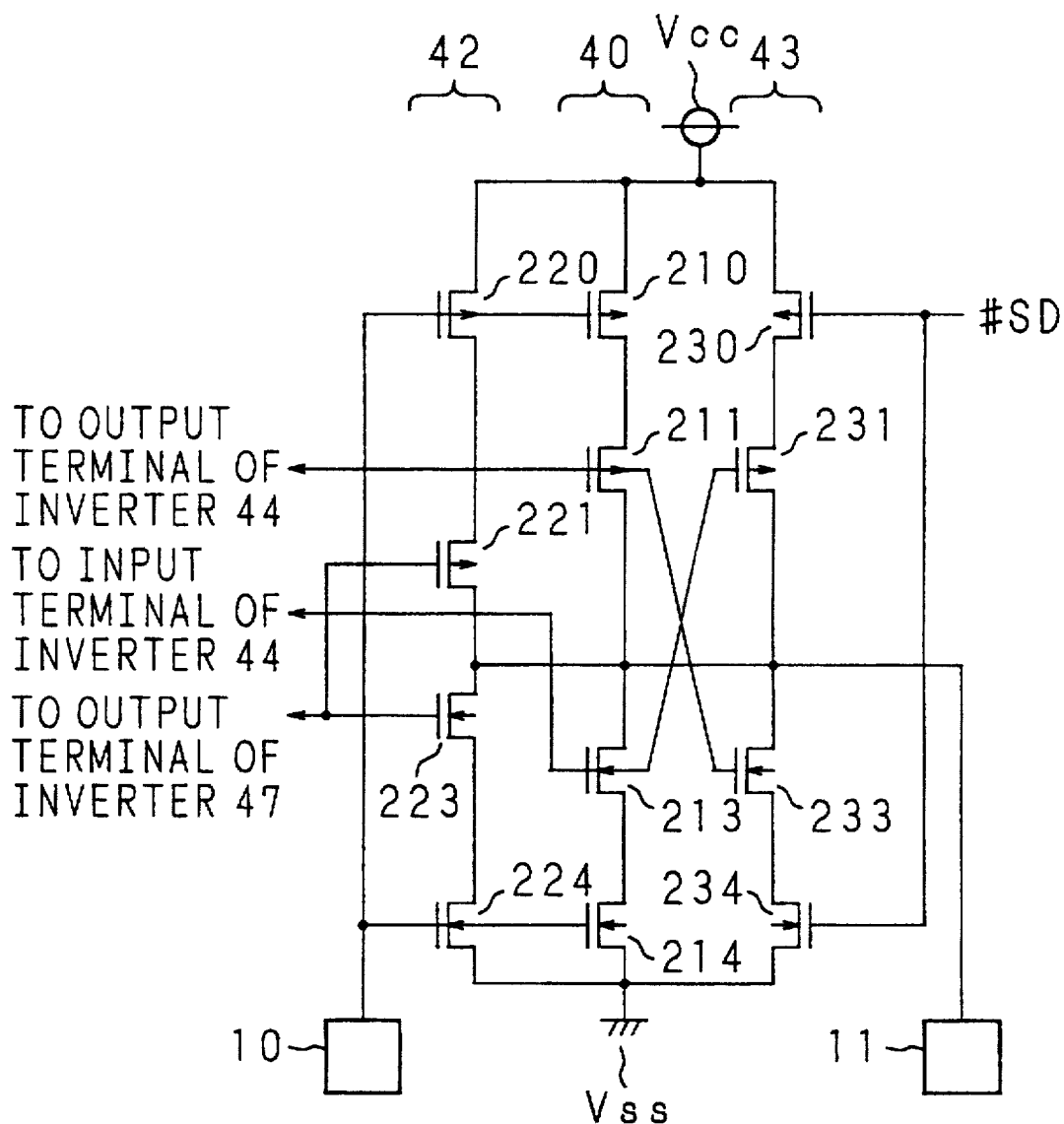
FIG. 19 is a block diagram showing a structure of a clocked inverter shown in FIG. 18.

FIG. 19 is a block diagram in which the clocked inverters 40, 42 and 43 in FIG. 18 are constituted of MOS transistors. Between the power source $V_{CC}$ and the grounded power source $V_{SS}$, a series circuit of P-channel transistors 220 and 221 and N-channel transistors 223 and 224 is interposed. In addition, a series circuit of P-channel transistors 210 and 211 and N-channel transistors 213 and 214 is interposed. Further, a series circuit of P-channel transistors 230 and 231 and N-channel transistors 233 and 234 is interposed. Each gate of the P-channel transistors 220 and 210 and N-channel transistors 224 and 214 is connected to the clock input terminal 10.

Gates of the P-channel transistor 230 and the N-channel transistor 234 are connected in common. The inversion terminal state selection signal #SD is inputted to the common gate. Each gate of the N-channel transistor 213 and the P-channel transistor 231 is connected to the input terminal of the inverter 44 (see FIG. 18). Each gate of the P-channel transistor 221 and the N-channel transistor 223 is connected to the output terminal of the inverter 47 (see FIG. 18). Each gate of the P-channel transistor 211 and the N-channel transistor 233 is connected to the output terminal of the inverter 44 (see FIG. 18). A connecting part between the P-channel transistor 221 and the N-channel transistor 223, a connecting part between the P-channel transistor 211 and the N-channel transistor 213, and a connecting part between the P-channel transistor 231 and the N-channel transistor 233 are connected in common to the clock output terminal 11. The P-channel transistors 220 and 221 and N-channel transistors 223 and 224 constitute the clocked inverter 42. The P-channel transistors 210 and 211 and N-channel transistors 213 and 214 constitute the clocked inverter 40. The P-channel transistors 230 and 231 and N-channel transistors 233 and 234 constitute the clocked inverter 43.

Figure 1:
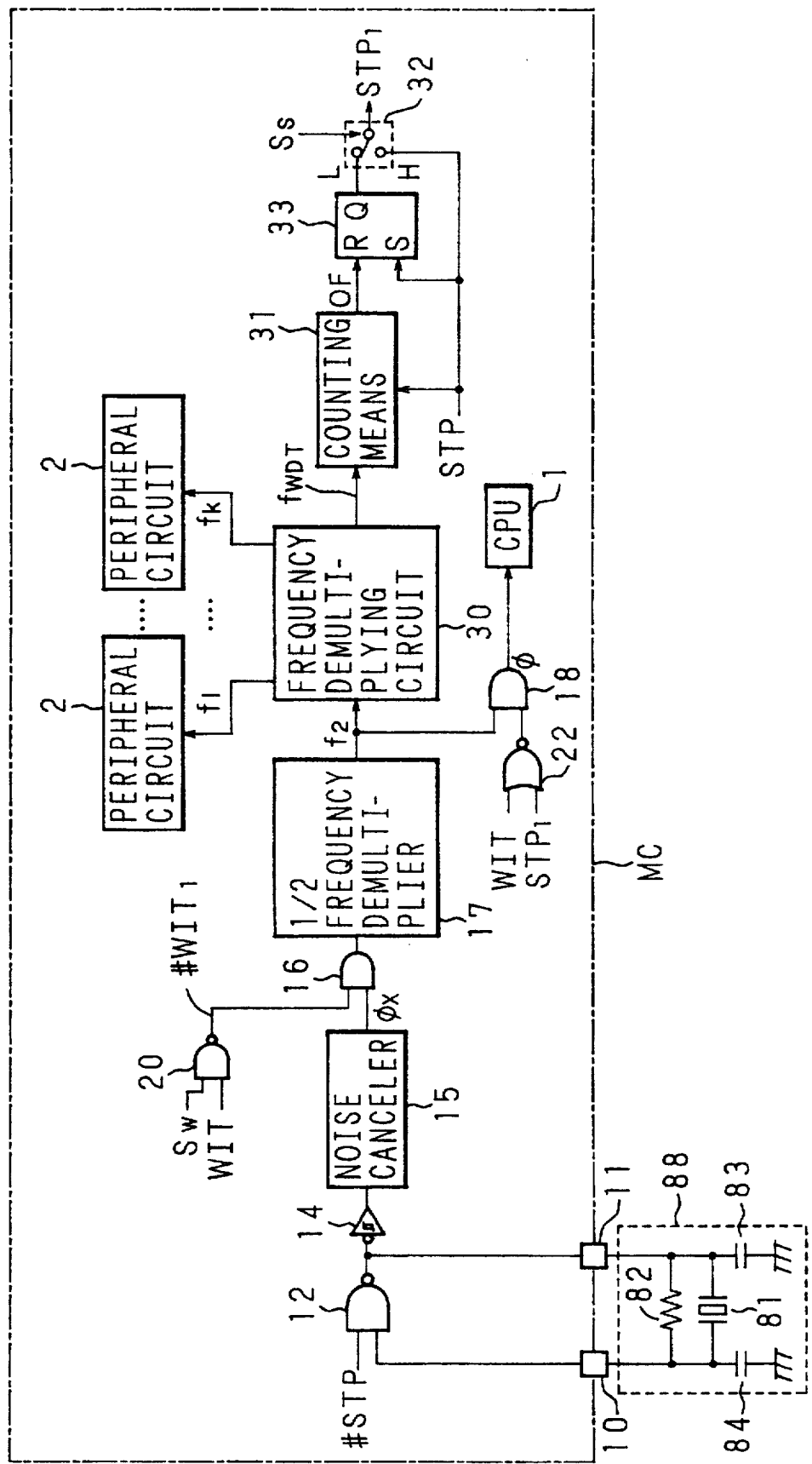
FIG. 1 is a block diagram showing a structure of a conventional microcomputer.
Figure 2A:
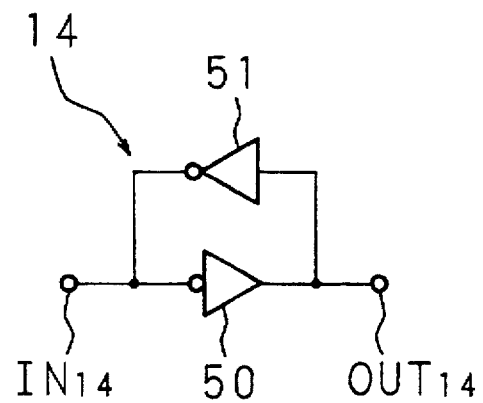
FIGS. 2A and 2B are structural diagrams of a Schmidt trigger circuit.
Figure 2B:
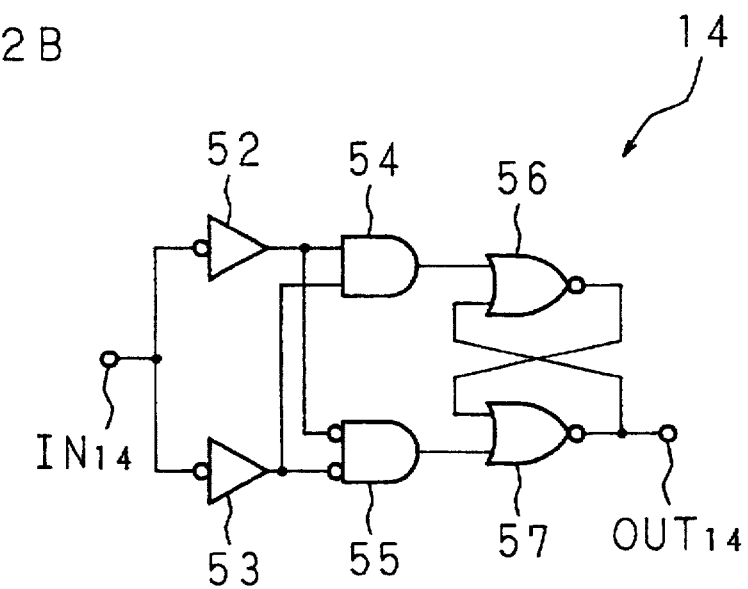
Figure 3A:
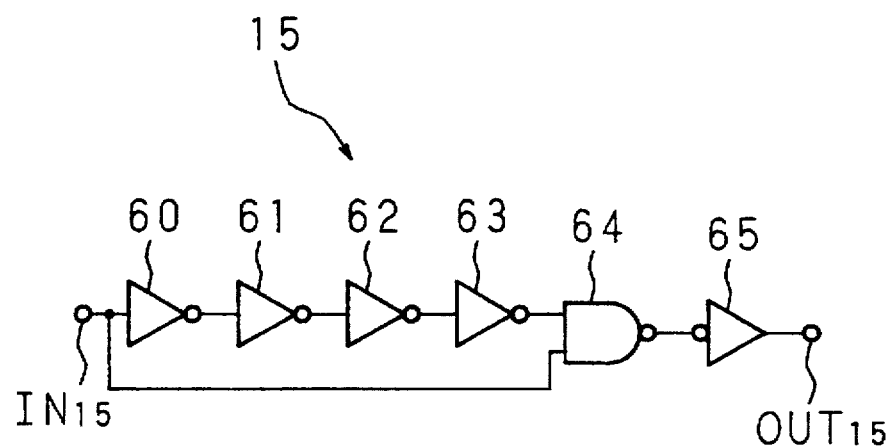
FIGS. 3A and 3B are structural diagrams of a noise canceler.
Figure 3B:
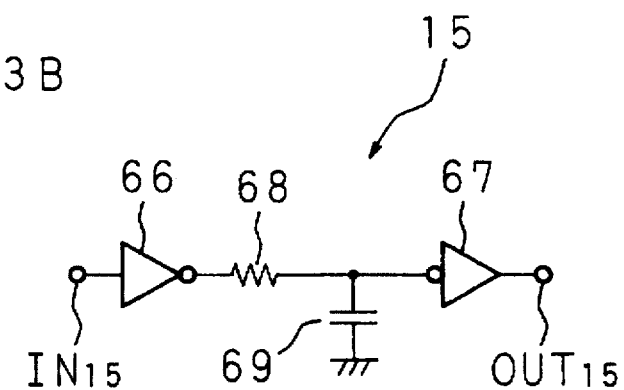
Figure 4:
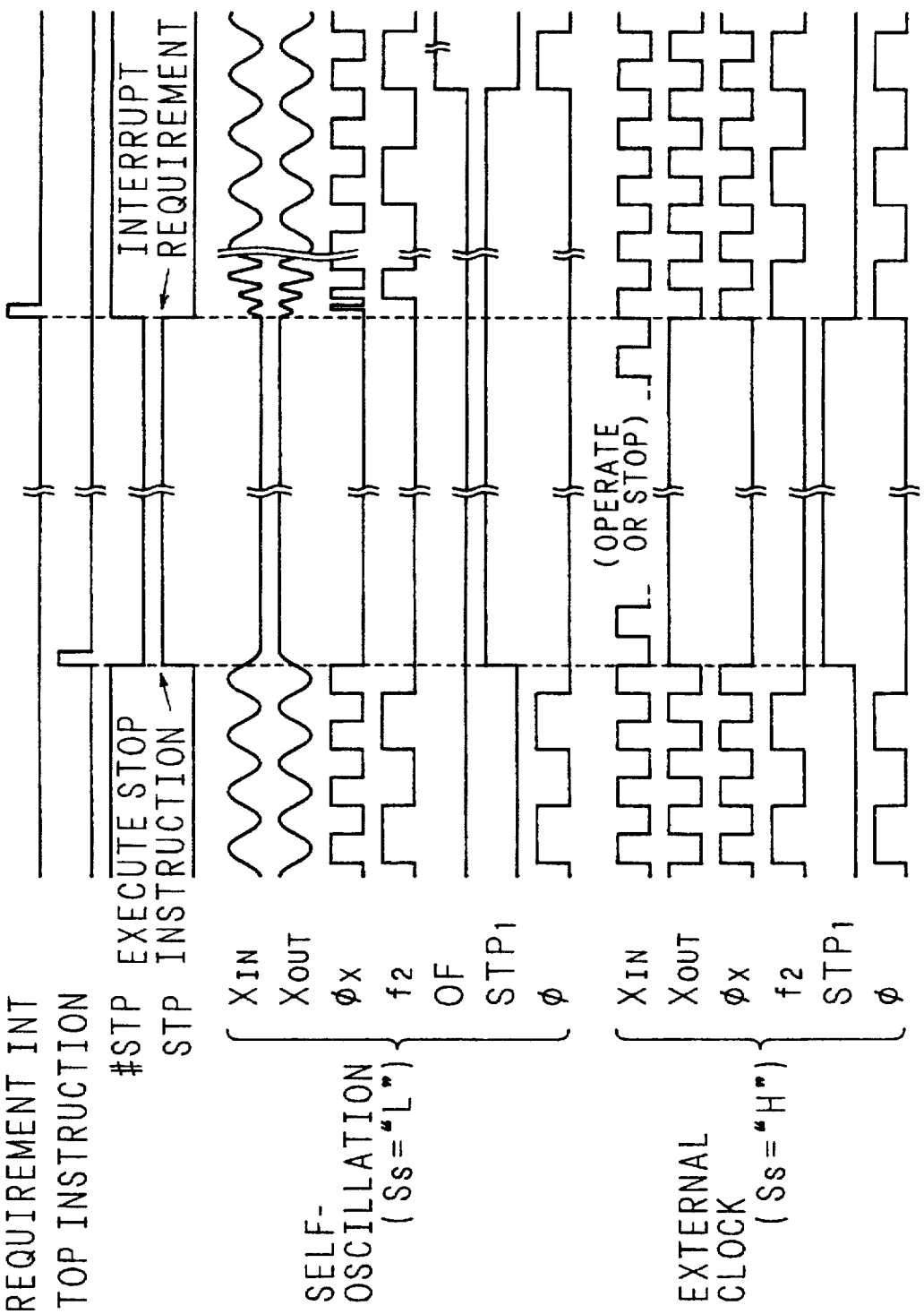
FIG. 4 is a timing chart of signals in each part in the conventional microcomputer.
Figure 5:
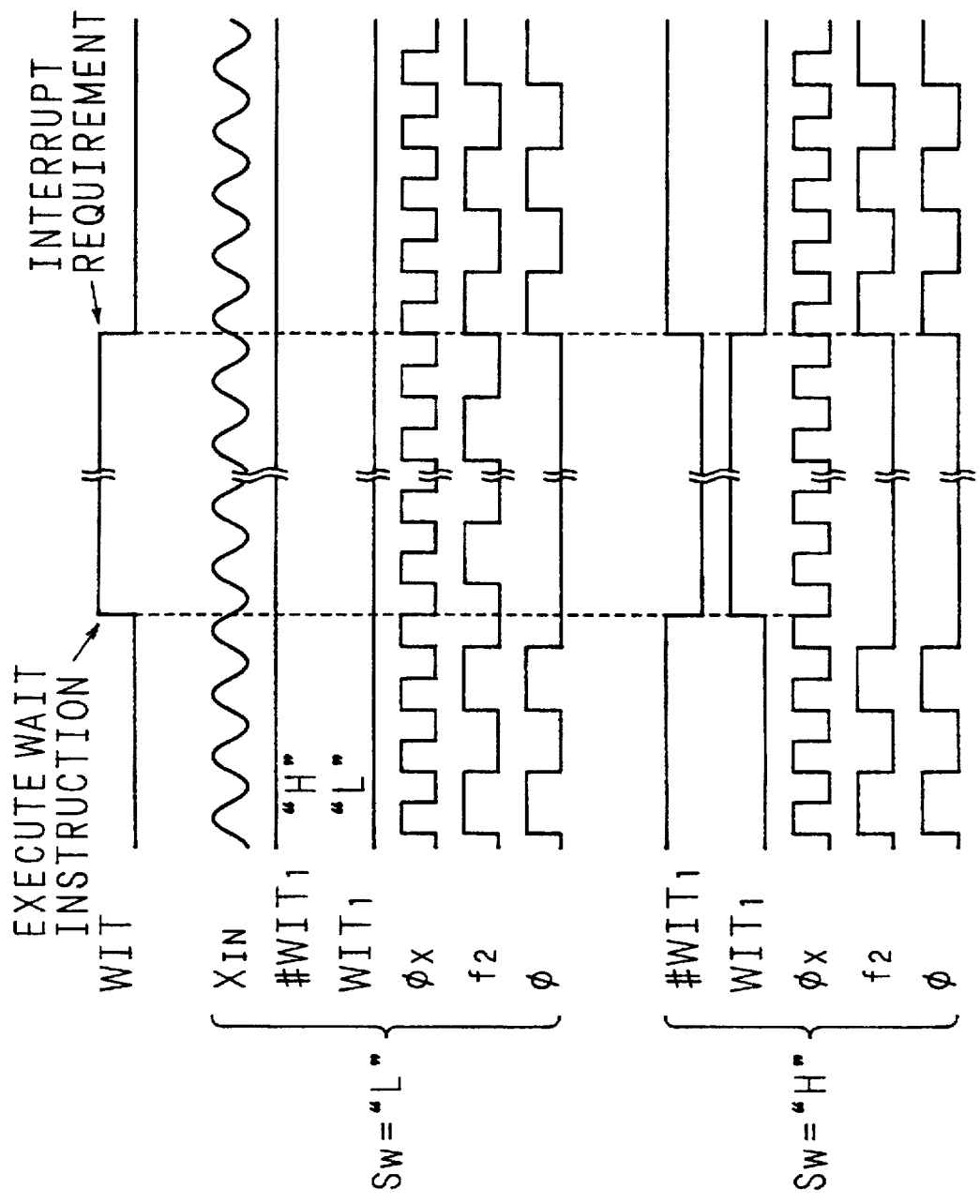
FIG. 5 is a timing chart of signals in each part in the conventional microcomputer.
Figure 6:
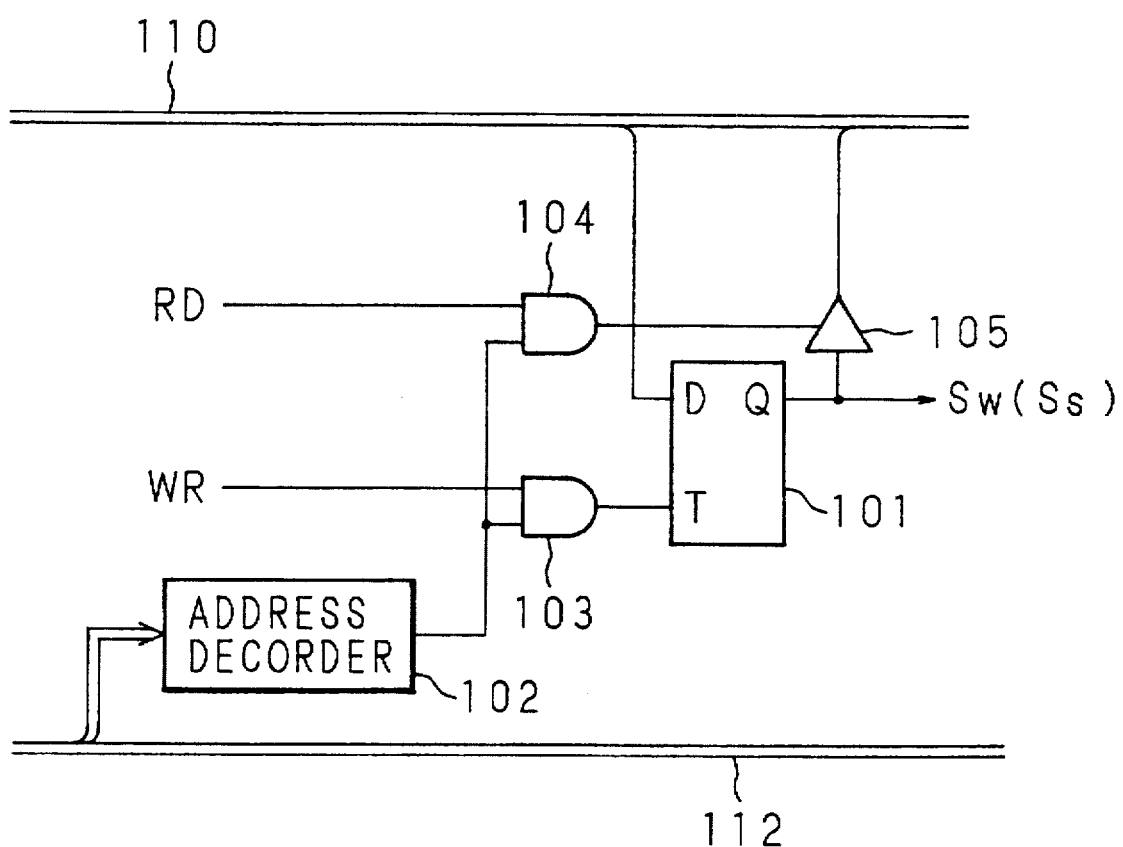
FIG. 6 is a structural diagram of a register.
Figure 7:
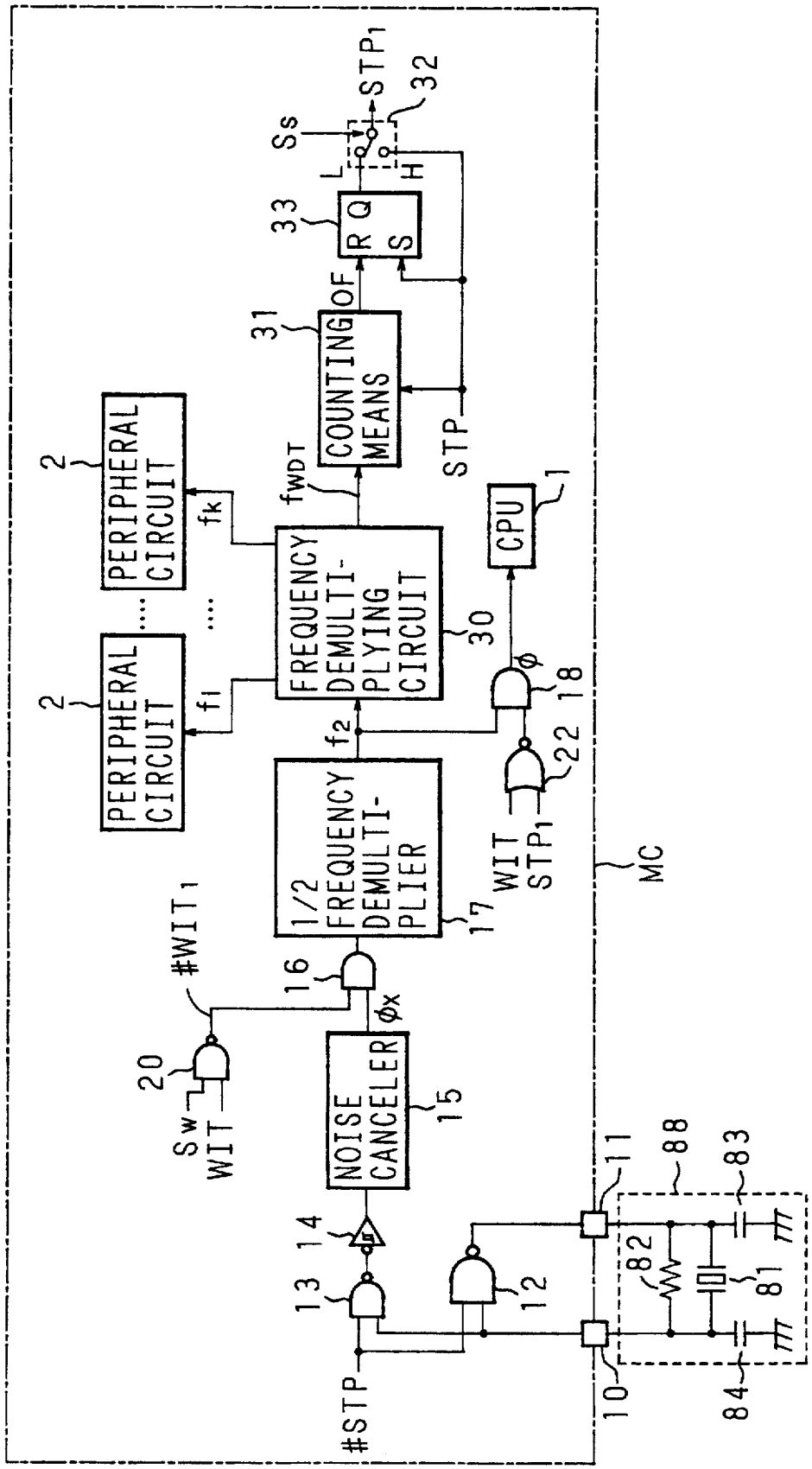
FIG. 7 is a block diagram showing a different structure of the conventional microcomputer.
Figure 8:
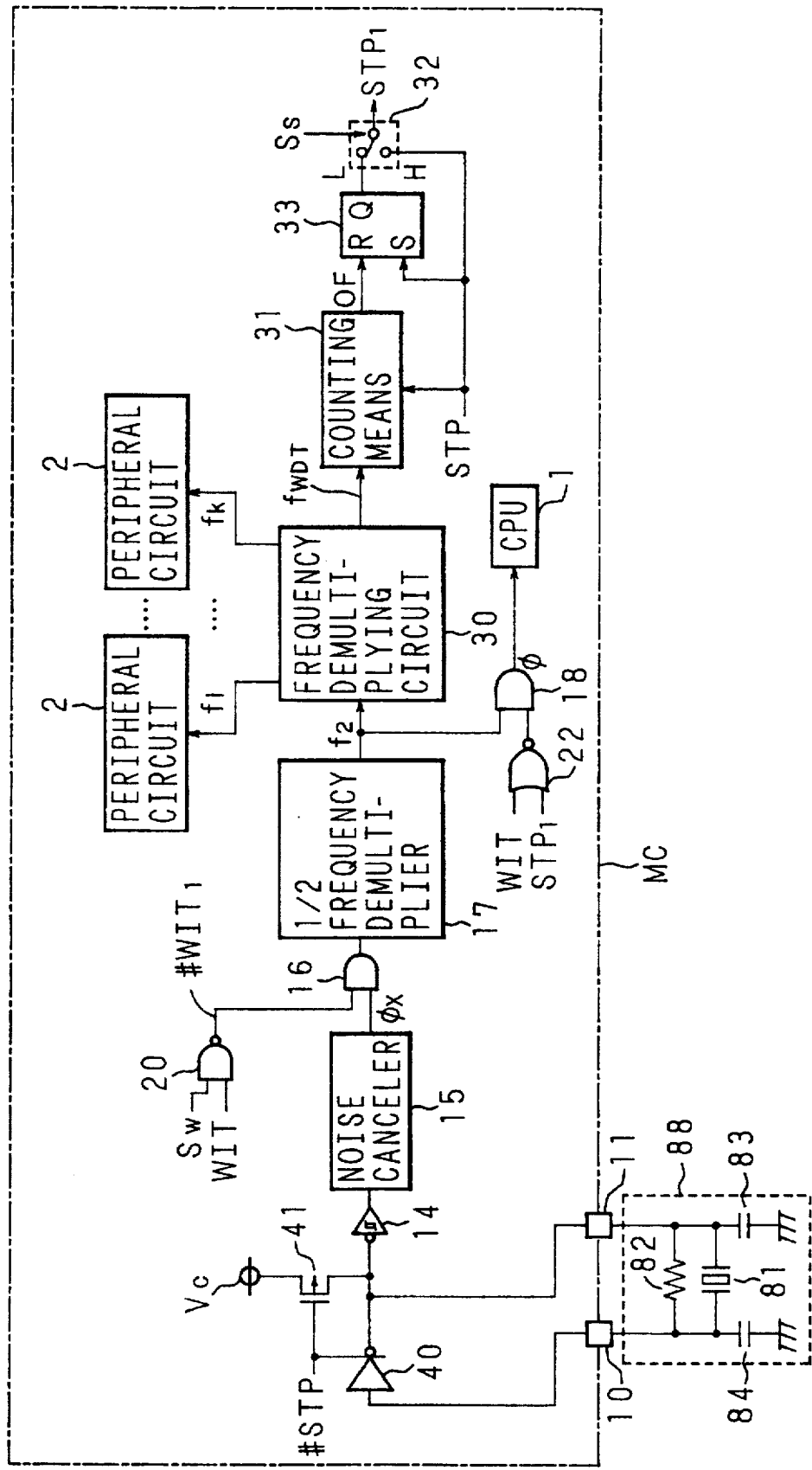
FIG. 8 is a block diagram showing a further different structure of the conventional microcomputer.
Figure 20:
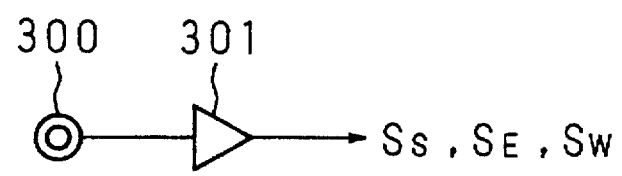
FIG. 20 is a structural diagram of a circuit for outputting a selection signal.

In the aforementioned embodiments, the microcomputer is constituted so that the wait state selection signal $S_W$, the stop return selection signal $S_S$ and the oscillation state selection signal $S_E$ are outputted from the register as shown in FIG. 6 which is incorporated in the microcomputer, and the signals are variable by changing the storage state of the signals through writing by the CPU. For example, a selection signal (state selection) from an input terminal 300 as shown in FIG. 20 may be inputted to an input buffer 301 and after being passed through a predetermined control circuit, or directly output as the above selection signal. When the register in the microcomputer is used, there is a fear that the storage state might be changed by electric noises transmitted from the signal input terminal, power source terminal or the like to the microcomputer or an error in writing to the register resulting from the runaway of the CPU. Therefore, it is more advantageous in terms of safety to select according to the input state at the input terminal 300 an extremely important signal for driving the microcomputer, e.g., for suspending the oscillation operation, or suspending the clock supply than to select by means of the register.

Incidentally, in the aforementioned embodiments, the clock distorted little in waveform which is inputted to the clock input terminal is supplied to the CPU. However, it goes without saying that the same effect can be obtained when the clock given to the clock output terminal is supplied to the CPU.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A microcomputer in which a CPU is operated on the basis of a clock signal inputted to a first clock terminal, comprising:

said first clock terminal and a second clock terminal to which a clock generating circuit is to be connected;

a first gate circuit provided between said first and second clock terminals so as to allow the clock generating circuit to be oscillated when in a transmissible state to transmit a signal; and a second gate circuit for providing to the first gate circuit a first signal which is a logical OR of a stop signal for suspending the oscillation of the clock signal and an oscillation state selection signal indicative of whether the clock signal inputted to the first clock terminal is a clock signal generated by the clock generating circuit, wherein said first gate circuit is placed in the transmissible state when the first signal is on a first level, and in a state in which it is not able to transmit a signal when the first signal is on a second level.

2. A microcomputer according to claim 1, further comprising a third gate circuit whose output terminal is connected to the second clock terminal, said third gate circuit being able to be placed in a floating state, wherein said first gate circuit can be placed in the floating state, said second gate circuit provides said first signal to said first gate circuit and said third gate circuit, when said first signal is on the first level, said first gate circuit is in the transmissible state and said third gate circuit is placed in the floating state, when said first signal is on the second level, said first gate circuit is in the floating state and said third gate circuit is in the transmissible state.

3. A microcomputer according to claim 2, further comprising:

a fourth gate circuit which is connected in parallel to said first gate circuit, and is able to be placed in the floating state; and a fifth gate circuit for providing to the fourth gate circuit a second signal which is a logical OR of the first signal and a driving efficiency selection signal for selecting a driving efficiency for the clock generating circuit, wherein said fourth gate circuit is placed in the transmissible state when the second signal is on the first level, and in the floating state when the signal is on the second level.

4. A microcomputer according to claim 3, further comprising:

counting means for counting clocks inputted to the first clock terminal since the supply of clocks is started or resumed; and a sixth gate circuit for supplying a clock to the CPU;

wherein said sixth gate circuit is kept in the non-transmissible state until said counting means counts a predetermined number when the oscillation state selection signal is on the first level, and placed in the transmissible state when the oscillation state selection signal is on the second level.

5. A microcomputer according to claim 4, further comprising:

a seventh gate circuit for supplying to the CPU a clock given to the first clock terminal or the second clock terminal; and an AND gate circuit for providing to the seventh gate circuit an AND signal of a wait signal for suspending the operation of the CPU, and a wait state selection signal for selecting the suspension or non-suspension of the operation of peripheral circuits;

wherein said seventh gate circuit is placed in the transmissible state when the wait state selection signal or the wait signal is on the first level, and in the non-transmissible state when the wait state selection signal and the wait signal are both on the second level.

6. A microcomputer according to claim 5 further comprising an input terminal for inputting an oscillation state selection signal, or an input terminal for inputting a wait state selection signal.

7. A microcomputer according to claim 4 further comprising:

a seventh gate circuit for supplying to the CPU a clock given to the first clock terminal or the second clock terminal;

wherein said seventh gate circuit is placed in the transmissible state when a wait signal for suspending the operation of the CPU is on the first level, and in the non-transmissible state when the wait signal is on the second level.

8. A microcomputer according to claim 3, further comprising:

a seventh gate circuit for supplying to the CPU a clock given to the first clock terminal or the second clock terminal; and an AND gate circuit for providing to the seventh gate circuit an AND signal of a wait signal for suspending the operation of the CPU, and a wait state selection signal for selecting the suspension or non-suspension of the operation of peripheral circuits;

wherein said seventh gate circuit is placed in the transmissible state when the wait state selection signal or the wait signal is on the first level, and in the non-transmissible state when the wait state selection signal and the wait signal are both on the second level.

9. A microcomputer according to claim 8 further comprising an input terminal for inputting an oscillation state selection signal, or an input terminal for inputting a wait state selection signal.

10. A microcomputer according to claim 3, further comprising:

a seventh gate circuit for supplying to the CPU a clock given to the first clock terminal or the second clock terminal;

wherein said seventh gate circuit is placed in the transmissible state when a wait signal for suspending the operation of the CPU is on the first level, and in the non-transmissible state when the wait signal is on the second level.

11. A microcomputer according to claim 2, further comprising:

counting means for counting clocks inputted to the first clock terminal since the supply of clocks is started or resumed; and a sixth gate circuit for supplying a clock to the CPU;

wherein said sixth gate circuit is kept in the non-transmissible state until said counting means counts a predetermined number when the oscillation state selection signal is on the first level, and placed in the transmissible state when the oscillation state selection signal is on the second level.

12. A microcomputer according to claim 11, further comprising:

a seventh gate circuit for supplying to the CPU a clock given to the first clock terminal or the second clock terminal; and an AND gate circuit for providing to the seventh gate circuit an AND signal of a wait signal for suspending the operation of the CPU, and a wait state selection signal for selecting the suspension or non-suspension of the operation of peripheral circuits;

wherein said seventh gate circuit is placed in the transmissible state when the wait state selection signal or the wait signal is on the first level, and in the non-transmissible state when the wait state selection signal and the wait signal are both on the second level.

13. A microcomputer according to claim 12 further comprising an input terminal for inputting an oscillation state selection signal, or an input terminal for inputting a wait state selection signal.

14. A microcomputer according to claim 11, further comprising:

a seventh gate circuit for supplying to the CPU a clock given to the first clock terminal or the second clock terminal;

wherein said seventh gate circuit is placed in the transmissible state when a wait signal for suspending the operation of the CPU is on the first level, and in the non-transmissible state when the wait signal is on the second level.

15. A microcomputer according to claim 2, further comprising:

a seventh gate circuit for supplying to the CPU a clock supplied to the first clock terminal or the second clock terminal; and an AND gate circuit for providing to the seventh gate circuit an AND signal of a wait signal for suspending the operation of the CPU, and a wait state selection signal for selecting the suspension or non-suspension of the operation of peripheral circuits;

wherein said seventh gate circuit is placed in the transmissible state when the wait state selection signal or the wait signal is on the first level, and in the non-transmissible state when the wait state selection signal and the wait signal are both on the second level.

16. A microcomputer according to claim 15 further comprising an input terminal for inputting an oscillation state selection signal, or an input terminal for inputting a wait state selection signal.

17. A microcomputer according to claim 2, further comprising:

a seventh gate circuit for supplying to the CPU a clock given to the first clock terminal or the second clock terminal;

wherein said seventh gate circuit is placed in the transmissible state when a wait signal for suspending the operation of the CPU is on the first level, and in the non-transmissible state when the wait signal is on the second level.

18. A microcomputer according to claim 1, further comprising:

counting means for counting clocks inputted to the first clock terminal since the supply of clocks is started or resumed; and a sixth gate circuit for supplying a clock to the CPU, wherein said sixth gate circuit is kept in the non-transmissible state until said counting means counts a predetermined number when the oscillation state selection signal is on the first level, and placed in the transmissible state when the oscillation state selection signal is on the second level.

19. A microcomputer according to claim 18, further comprising:

a seventh gate circuit for supplying to the CPU a clock given to the first clock terminal or the second clock terminal; and an AND gate circuit for providing to the seventh gate circuit an AND signal of a wait signal for suspending the operation of the CPU, and a wait state selection signal for selecting the suspension or non-suspension of the operation of peripheral circuits;

wherein said seventh gate circuit is placed in the transmissible state when the wait state selection signal or the wait signal is on the first level, and in the non-transmissible state when the wait state selection signal and the wait signal are both on the second level.

20. A microcomputer according to claim 19 further comprising an input terminal for inputting an oscillation state selection signal, or an input terminal for inputting a wait state selection signal.

21. A microcomputer according to claim 18, further comprising:

a seventh gate circuit for supplying to the CPU a clock given to the first clock terminal or the second clock terminal;

wherein said seventh gate circuit is placed in the transmissible state when a wait signal for suspending the operation of the CPU is on the first level, and in the non-transmissible state when the wait signal is on the second level.

22. A microcomputer according to claim 1, further comprising:

a seventh gate circuit for supplying to the CPU a clock given to the first clock terminal or the second clock terminal; and an AND gate circuit for providing to the seventh gate circuit an AND signal of a wait signal for suspending the operation of the CPU, and a wait state selection signal for selecting the suspension or non-suspension of the operation of peripheral circuits;

wherein said seventh gate circuit is placed in the transmissible state when the wait state selection signal or the wait signal is on the first level, and in the non-transmissible state when the wait state selection signal and the wait signal are both on the second level.

23. A microcomputer according to claim 22 further comprising an input terminal for inputting an oscillation state selection signal, or an input terminal for inputting a wait state selection signal.

24. A microcomputer according to claim 1, further comprising:

a seventh gate circuit for supplying to the CPU a clock given to the first clock terminal or the second clock terminal;

wherein said seventh gate circuit is placed in the transmissible state when a wait signal for suspending the operation of the CPU is on the first level, and in the non-transmissible state when the wait signal is on the second level.

* * * * *